US011114112B2

(12) United States Patent
Poulsen

(10) Patent No.: US 11,114,112 B2
(45) Date of Patent: Sep. 7, 2021

(54) LOW POWER, HIGH BANDWIDTH, LOW LATENCY DATA BUS

(71) Applicant: Google LLC, Mountain View, CA (US)

(72) Inventor: Jens Kristian Poulsen, Kitchener (CA)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/428,778

(22) Filed: May 31, 2019

(65) Prior Publication Data

US 2019/0287549 A1 Sep. 19, 2019

Related U.S. Application Data

(63) Continuation-in-part of application No. 16/125,617, filed on Sep. 7, 2018, now Pat. No. 10,734,012.

(60) Provisional application No. 62/678,993, filed on May 31, 2018, provisional application No. 62/721,412, filed on Aug. 22, 2018, provisional application No. 62/555,638, filed on Sep. 7, 2017.

(51) Int. Cl.
*G10L 21/055* (2013.01)
*G06F 3/16* (2006.01)

(52) U.S. Cl.
CPC ............ *G10L 21/055* (2013.01); *G06F 3/162* (2013.01)

(58) Field of Classification Search
CPC ...................................................... G06F 3/162
USPC ......................................................... 704/503
See application file for complete search history.

(56) References Cited

U.S. PATENT DOCUMENTS 7,382,844 B2   6/2008  Hwang et al.
10,734,012 B2  8/2020  Poulsen
2002/0116468 A1  8/2002  Ishikawa
2004/0184406 A1  9/2004  Iwamura
2004/0187044 A1  9/2004  Barman et al.
2008/0080261 A1*  4/2008  Shaeffer .................. G11C 7/222
                                                     365/189.05
2009/0157928 A1  6/2009  Riegebauer
(Continued)

FOREIGN PATENT DOCUMENTS

JP           5908167          4/2016

OTHER PUBLICATIONS

R. V. White and D. Freeman, "Data Communications Issues For Power System Management," APEC 07—Twenty-Second Annual IEEE Applied Power Electronics Conference and Exposition, 2007, pp. 1188-1199, doi: 10.1109/APEX.2007.357666. (Year: 2007).*

*Primary Examiner* — Bharatkumar S Shah
(74) *Attorney, Agent, or Firm* — Lerner, David, Littenberg, Krumholz & Mentlik, LLP

(57) ABSTRACT

Data bus includes a device controller coupled to a first interface for digital communications using a first communications protocol, the device controller including a master bus controller controlling a multi-drop bus using a second communications protocol, and a slave device coupled to the multi-drop bus and configured to transmit and receive digital communications with the device controller using the second communications protocol. Each transmission line end is terminated using a device attached at one end of the transmission line and by another device attached at the other end. The second communications protocol supports multiple data rates using a fixed frame format. Safe synchronization may be established by systematically eliminating all false positions instead of searching for a valid candidate. Noise in the audio band may be lowered by scrambling of the data using a pseudo-random generator.

6 Claims, 26 Drawing Sheets

(56) References Cited

U.S. PATENT DOCUMENTS

| | | |
|---|---|---|
| 2009/0295438 A1 | 12/2009 | Jammula et al. |
| 2009/0327789 A1 | 12/2009 | Zerbe et al. |
| 2010/0158037 A1* | 6/2010 | Heinke ................. H04L 12/64 370/445 |
| 2012/0144078 A1 | 6/2012 | Poulsen |
| 2013/0322462 A1 | 12/2013 | Poulsen |
| 2014/0281079 A1* | 9/2014 | Biskup ............... G06F 11/1423 710/110 |
| 2015/0214965 A1* | 7/2015 | Odedara .............. H03L 7/0816 327/158 |
| 2016/0092385 A1 | 3/2016 | Chilikin |
| 2016/0191184 A1 | 6/2016 | Hsueh et al. |
| 2018/0357194 A1 | 12/2018 | Ulmer et al. |
| 2020/0389244 A1 | 12/2020 | Furtner |

* cited by examiner

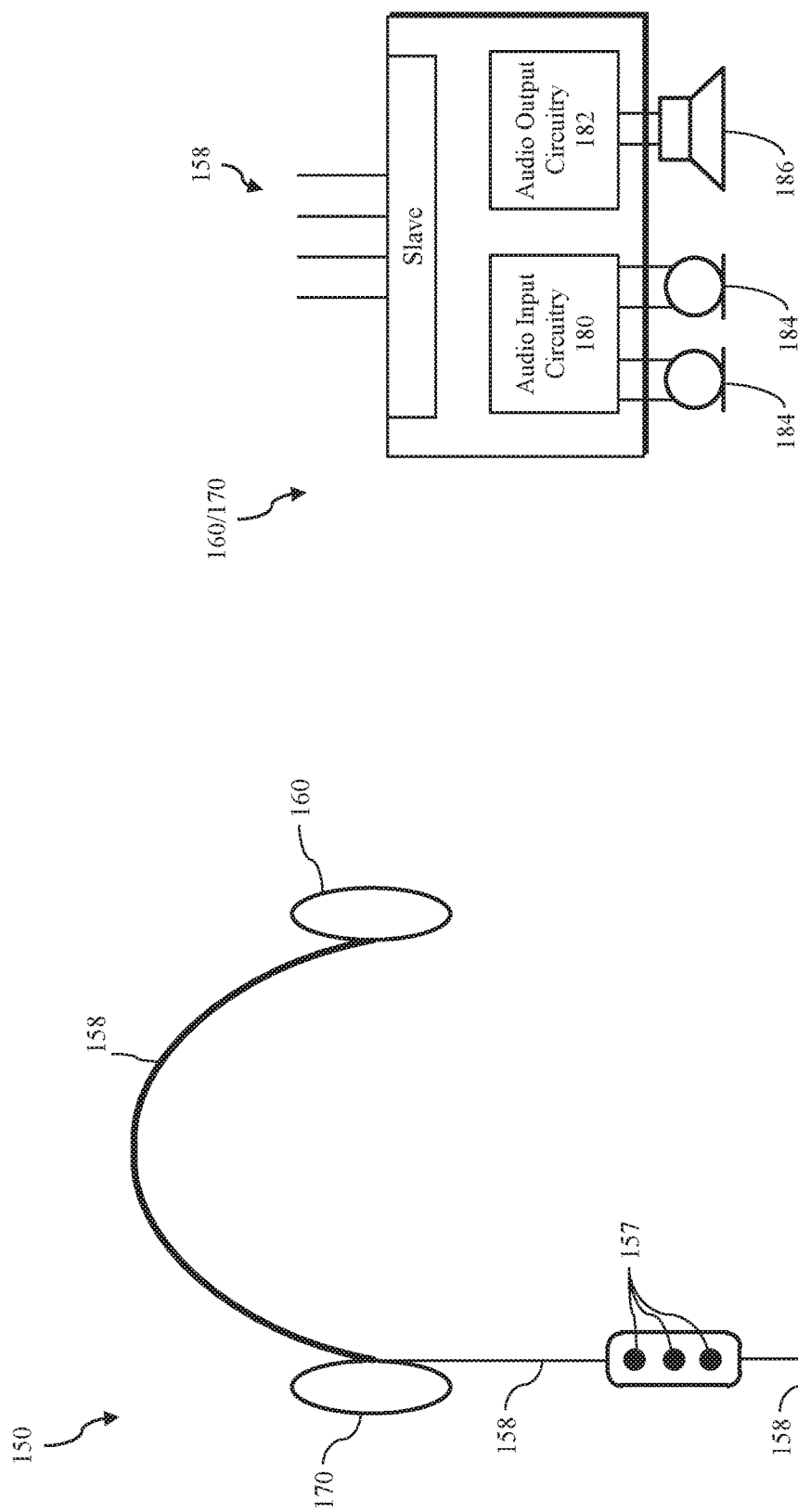

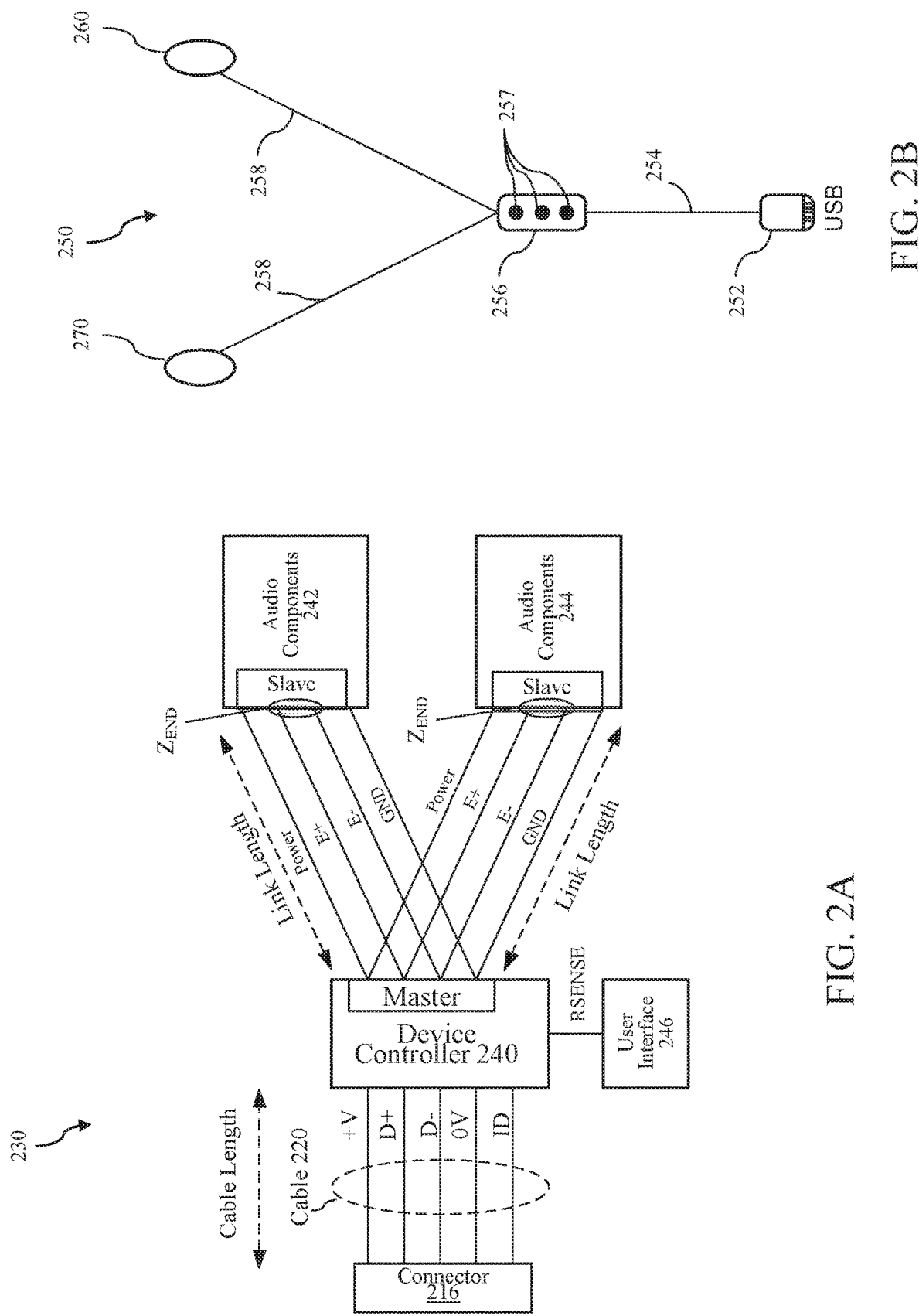

FIG. 9A 3072 kHz sync
6144k line rate

| 0 | 1 | CMD | 16 bits master audio | Two-way |
|---|---|---|---|---|
| R | Two-way | | 16 bits slave audio | Two-way |

FIG. 9B 3200 kHz sync
9600 line rate

| 0 | 1 | CMD | 10 bits master audio | One way |
|---|---|---|---|---|
| One way | R | Two-way | 12 bits slave audio | 10 bits slave audio / Two-way |

FIG. 9C 3200 kHz sync
9600 line rate

| 0 | 1 | CMD | 11 bits master audio | |
|---|---|---|---|---|
| One way | 11 bits master audio | | Two-way | One way |
| | 11 bits slave audio | | R | Two-way |

FIG. 9D

| | | | | |
|---|---|---|---|---|
| 0 | Two-way | Master audio 32 bits | CMD | |
| 1 | | Slave audio 32 bits | | Two-way |
| | | Master audio 32 bits | CMD | |
| | Two-way | Slave audio 32 bits | | Two-way |

768 kHz sync — 144 bits per frame

FIG. 9E

| | | | | |
|---|---|---|---|---|
| 0 | Two-way | Master audio 20 bits | CMD | |
| 1 | | Slave audio 20 bits | | Two-way |
| | Two-way | Master audio 20 bits | CMD | |
| | | Slave audio 20 bits | | Two-way |
| | Two-way | Master audio 20 bits | CMD | |
| | | Slave audio 20 bits | | Two-way |

800 kHz sync — 144 bits per frame

| Symbol | Description | Driver | Functionality |
|---|---|---|---|
| 0 \| 1 | A zero to one transition used by the PLL in a slave device to synchronize to the master | Master | Synchronization |
| OP0 | Operation bit 0 signifying command | Master | Command |
| DV0 | Device bit 0 signifying the addressed device number | Master | Command |
| PAR | Parity bit, even parity generated by the master based on values from current command | Master | Data integrity |
| S | Stop bit. This bit is used to mark the passing of the last sync symbol in a frame. | Master | Synchronization |
| D0 | Data field bit 0 within write command (master writes to slave) | Master | Command |
| CMD | Command | Master | Command |
| R | Response | Slave | Response |
| D0 | Data field bit 0 within read command (read data from slave) | Slave | Command |
| 32 bits master audio | Transfer audio from master device to slave device | Slave device | Audio data |
| 16 bits slave audio | Transfer audio from slave device to master device | Slave device | Audio data |
| Two-way | A double time-slot delay used during handover from master to slave | None | Flush transmission line |

LOW POWER, HIGH BANDWIDTH, LOW LATENCY DATA BUS

CROSS-REFERENCE TO RELATED APPLICATIONS

This application claims priority to and the benefit of U.S. Provisional Patent Application No. 62/678,993, filed May 31, 2018; and U.S. Provisional Patent Application No. 62/721,412, filed Aug. 22, 2018.

This application is a continuation-in-part of U.S. patent Ser. No. 16/125,617, filed Sep. 7, 2018, which claims priority to and the benefit of U.S. Provisional Patent Application No. 62/555,638, filed Sep. 7, 2017; U.S. Provisional Patent Application No. 62/678,993, filed May 31, 2018; and U.S. Provisional Patent Application No. 62/721,412, filed Aug, 22, 2018; each of which is incorporated by reference herein in its entirety.

TECHNICAL FIELD

The present disclosure relates generally to data communications and, more particularly, for example, to systems and methods for communication of digital data between devices.

BACKGROUND

Various interfaces for transmitting and receiving digital data between electronic devices are known in the art. Existing interfaces, however, do not meet the all needs of many modern systems. It is often desirable to enable high bandwidth communications for a variety of connected devices, while maintaining reliability and good signal quality, and meeting the need for low cost, low power devices. For example, an adaptive noise cancellation (ANC) headset may require complex and expensive equipment, and high bandwidth communications between the ANC headset and a host device may be desirable for certain applications, such as processing a noise cancellation signal on a host device.

In some approaches, high bandwidth communication is achieved through a digital communications link that terminates at the receiver. These approaches may provide satisfactory signal integrity for certain configurations, but if there is simultaneously a requirement for low power consumption, the static power consumption in the receiver termination may be undesirable. Further, many of these approaches are not optimized for low latency data transfer, because data communications could take a full sample period to be transferred over the digital communications link. Some systems often have additional requirements, such as supporting connections to multiple devices and supporting physical links meeting certain length requirements (e.g., 1-2 meters). Additional requirements may include communications between connected devices, support for and flexibility to conform to different device types, and support for various data transfer implementations including bulk data transfers in systems where data is transported in a serialized format.

In view of the foregoing, there is a continued need in the art for improved digital data communications systems and methods.

SUMMARY

The present disclosure provides systems and methods that address the need in the art for improved digital data communications between physically connected devices. In various embodiments, data bus systems and methods include a device controller coupled to a first interface for digital audio data communications in accordance with a first communications protocol. The device controller includes a master bus controller for controlling a multi-drop bus in accordance with a second communications protocol. A first slave device is coupled to the multi-drop bus and configured to transmit and receive digital audio data communications with the device controller in accordance with the second communications protocol. Each transmission line is terminated using the device attached at one end of the transmission line and by another device attached at the other end, and reflections due to mismatches in impedance by inclusion of intermediate signaling nodes are controlled to allow multi-drop device support and high speed signaling. The second communications protocol may support multiple audio data rates using a fixed frame format.

In some embodiments, the first slave device and a second slave device connected to the bus are timed so that transmitted messages are sent as a sequence of forward or backward travelling waves, thereby enabling multi-drop high speed bi-directional communications using a terminated transmission line. In one embodiment, differential signaling is used for communications and one line is terminated in logic high and one line is terminated in logic low to reduce common mode interference. In one embodiment, differential signaling is used to lower EMI and termination of each transmission line is handled by setting the output driver to one of a high level and a low level according to a termination level when data is not transferred, and the bus is idle, thereby enabling lower power consumption by transmission end points.

In some embodiments, intermediate nodes on the transmission line are connected to the transmission line with a short interruption to a travelling wave, and with the requirement that stubs and/or disruptions of the transmission line are significantly shorter than the shortest wavelength used for signaling (e.g., less than 1/50 of the shortest wavelength). Power consumption may be reduced by using a signaling rate that is greater than a minimum required signaling rate and leaving the bus idle for a portion of every clock cycle or every frame, thereby reducing the power loss in terminations, provided the output termination level is equal to the final output state level (idle level). The power required for the signaling may be obtained by capacitive or inductive drop regulators thereby minimizing power loss in the regulators. By lowering the transmission voltage on the bus, the power consumption may be further limited and differential signaling may be employed to enable low voltage signaling while the system is being robust against external noise and EMI.

In some embodiments, delays between components are measured by charging the bus to a known value, disabling drivers at a beginning and an end of the transmission line to assure the bus is floating and not terminated during measurement, waiting for the devices to change a level on the bus and measuring a transition delay. The drivers at each end of the transmission line may be disabled during enumeration of components attached to the bus by allowing multiple drivers to change a current bus state. The current bus state may be set by a controller and one or more devices can change the transmission line to the opposite value within a given time window allowing enumeration of devices. The device controller may further comprise a phase-locked loop (PLL) or a delay-locked-loop (DLL) providing a first clock signal for synchronizing communications in accordance with the first communications protocol, a second clock signal for synchronizing communications in accordance with the second communications protocol, and a third clock signal for use in audio data processing.

In various embodiments, the second communications protocol supports different communications bandwidths using a fixed frame structure. In some embodiments, the data port or data following each sync signal is modulated by a high frequency carrier or pseudo-random generator thereby reducing current modulations in the audio band for lower interference in audio systems. The device controller, first slave device and second slave device may comprise an audio headset or other audio listening device. In some embodiments, terminations at the ends of the transmission lines are temporarily disabled during activation of the transmitters to reduce power consumption.

In various embodiments, a method comprises receiving and transmitting digital audio data across a first interface in accordance with a first communications protocol, controlling a multi-drop bus with a device controller in accordance with a second communications protocol, using a first slave device coupled to the multi-drop bus, receiving and transmitting digital audio data with the device controller in accordance with the second communications protocol, and setting the transmitters in each end of a transmission line to a known state to enable termination of any signal. In some embodiments, the second communications protocol may support multiple audio data rates using a fixed frame format.

The method may further comprise using a phase-locked or delay-locked loop to generate a first clock signal for synchronizing communications in accordance with the first communications protocol, a second clock signal for synchronizing communications in accordance with the second communications protocol, and a third clock signal for use in audio data processing. In some embodiments, the second communications protocol supports different communications bandwidths using a fixed frame structure. Dither may be added to the PLL or DLL for lowering the emitted EMI by spectral spreading. Data transferred on the bus may be scrambled on transmission and descrambled on receive for lowering the spectral content in the audio band.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 1B and 1C illustrate an exemplary headset in accordance with one or more embodiments.

FIG. 2A is an exemplary of a bus interface system in accordance one or more embodiments.

FIG. 2B illustrates an exemplary headset in accordance with one or more embodiments.

FIGS. 9A-F illustrate exemplary frame structures in accordance with one or more embodiments.

FIGS. 16A, 16B & 16C illustrate example frame structures that may be used in accordance with one or more embodiments.

FIGS. 18A, 18B and 18C illustrate example frame configurations for read and write operations, including bulk transfers, in accordance with one or more embodiments.

Figure 1A:
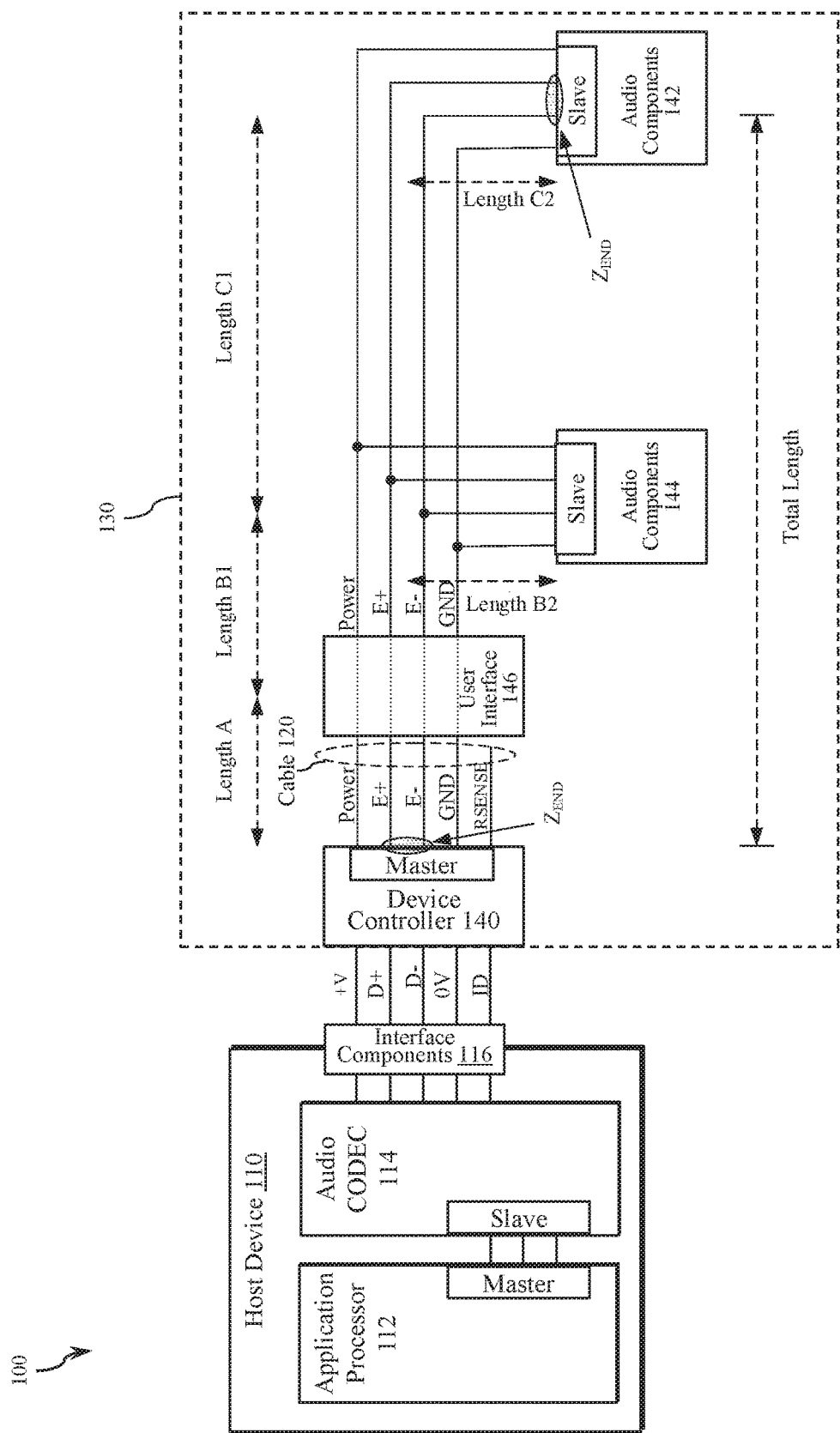
FIG. 1A is an exemplary a bus interface system in accordance one or more embodiments.

The included drawings are for illustrative purposes and serve only to provide examples of possible systems and methods for the disclosed methods and system for providing context aware audio processing. These drawings in no way limit any changes in form and detail that may be made to that which is disclosed by one skilled in the art without departing from the spirit and scope of this disclosure.

DETAILED DESCRIPTION

The present disclosure addresses a need in the art for improved digital data communications between electronic devices. In various embodiments, systems and methods are disclosed for providing low power, high bandwidth, multi-drop, and/or low latency communications between a master device and one or more slave devices connected through a physical data link. The present disclosure provides numerous advantages over conventional systems and methods, including lower power consumption, a combination of high bandwidth and long link length, low and well controlled latency, support of multi-drop topology in addition to point-to-point connections, and simple synchronization between devices.

In various embodiments, low power is obtained, even for terminated devices, through a process that includes transmitting bits fast and then leaving the bus idle for the rest of the clock cycle or the rest of the duration of the frame. A differential data bus terminated in opposite polarities facilitates a low power operation and reduced electromagnetic interference (EMI). The present disclosure also facilitates low power consumption in a configuration with unterminated ends, where a high frequency clock or timing element is used to ensure data can be received in one or more time units, thereby enabling a choice between high signal-to-noise ratio (SNR) and high data rate without changing the physical system, e.g., multiple time slots may be used to define each symbol for enabling a compromise between bandwidth and signal integrity.

The present disclosure further provides a multi-drop differential long length bus with multiple devices using end transmitters as the actual termination and using opposite termination polarity to ensure reduction of common signaling for low EMI. An algorithm for synchronization of connected devices includes finding time slots that are not changing in accordance with an expected pattern and systematically eliminating all invalid positions for safe synchronization. In this manner, certain implementations of the system can guarantee safe synchronization even with arbitrary random data. The search will first be finished when a single synchronization candidate is left and, therefore, any random data does not lead to false synchronization. An algorithm for bulk data transfers is also provided to facilitate transfer between memory modules independent of bus traffic. In some embodiments, lower EMI is achieved by adding dither to the system clock. Interference in the audio band may be lowered by scrambling data symbols before transmission and descrambling the values after reception (to obtain the original value). These and other features and advantages of the present disclosure will be understood with reference to the following disclosure.

Various embodiments are disclosed herein. In one embodiment, a system comprises a master device coupled to a multi-drop bus for digital communications using a communications protocol comprising a plurality time slots, and a first slave device coupled to the multi-drop bus and configured to transmit and receive digital communications with the master device in accordance with the communications protocol. At least one of the time slots is used to define a communications configuration for the first slave device to dynamically optimize bandwidth and/or signal integrity. The multi-drop bus is a differential data bus terminated in different voltage levels on the two lines thereby facilitating a low power operation and low electromagnetic interference. In one aspect, the multi-drop bus is a multi-drop differential long length bus configured to receive a plurality of slave devices using end transmitters. Power consumption is reduced by operating at a signaling rate that is greater than a required signaling rate and leaving the multi-drop bus idle for a portion of every cycle.

In one embodiment, the system is further configured to synchronize two or more connected devices, including identifying time slots that are not changing according to an expected fixed pattern and eliminating invalid positions for safe synchronization. The system is further configured to facilitate bulk data transfers independent of multi-drop bus digital communications traffic. In another aspect, the first slave device and a second slave device connected to the bus are timed such that transmitted messages are sent as a sequence of forward or backward travelling waves, thereby enabling multi-drop high speed bi-directional communications using a terminated transmission line. Intermediate nodes on the multi-drop bus are connected to the multi-drop bus with short interruption to a travelling wave, and a physical length of disruptions to the transmission line resulting from intermediate nodes are shorter than the shortest wavelength used for signaling.

In some embodiments, delays between devices are measured by charging the bus to a known value, disabling drivers at a beginning and an end of the bus to cause the bus to be floating and not terminated during measurement, waiting for the devices to change a level on the bus, and measuring a transition delay. A PLL or DLL is used to obtain lock between the master device and the first slave device. The system timing is obtained from a fractional PLL disposed in the master device and/or the first slave device and the PLL is dithered by adding an output from a pseudorandom generator to a fractional adder thereby reducing EMI. In one embodiment, a pseudorandom generator is configured to scramble an output of one or more data ports thereby enabling a lower EMI by whitening an output spectrum. The PLL and/or DLL may include a time-gate that is enabled during initial locking of the PLL and later only allows synchronization information to pass through to avoid the PLL to lock onto random bus traffic.

In various embodiments, a method includes providing a master device coupled to a multi-drop bus for digital communications using a communications protocol comprising a plurality time slots, coupling a first slave device to the multi-drop bus and configuring the slave device to transmit and receive digital communications with the master device in accordance with the communications protocol, and using at least one of the time slots to define a communications configuration for the first slave device to dynamically optimize bandwidth and/or signal integrity. The method may further comprise operating the multi-drop data bus as a differential data bus terminated in opposite polarities thereby facilitating a low power operation and low electromagnetic interference, and/or synchronizing two or more connected devices, including identifying time slots that are not changing according to an expected fixed pattern and eliminating invalid positions for safe synchronization. In some embodiments of the method, the first slave device and a second slave device connected to the bus are timed such that transmitted messages are sent as a sequence of forward or backward travelling waves, thereby enabling multi-drop high speed bi-directional communications using a terminated transmission line.

Referring to FIG. 1A, an exemplary audio system 100 will be described in accordance with one or more embodiments of the present disclosure. The system 100 includes a host device 110 and at least one connected device 130. The host device 110 may be any electronics device configured to send or receive audio data to or from the connected device 130 including, for example, a smart phone, a tablet computer, a laptop computer, an automobile voice interface, a voice conferencing system, an audio playback system or other electronics device. The connected device 130 may include one or more electronic devices configured to send, receive and/or process audio data and may include, for example, one or more microphones, loudspeakers or audio processing systems. Although the present embodiment is discussed with reference to audio communications, it will be appreciated that the systems and methods described herein may be implemented with other electronics devices and data types in accordance with the present disclosure.

In the illustrated embodiment, the host device 110 includes an application processor 112, an audio CODEC 114, and interface components 116. The application processor 112 controls digital audio data communications between the host device 110 and the connected device 130. The audio CODEC 114 provides audio input and/or output processing in accordance with requirements of the host device 110. The interface components 116 facilitate a physical connection between the host device 110 and the connected device 130 via a cable 120 and a compatible connector. In various embodiments, the interface components 116 may include a port for receiving the connector and a corresponding interface controller for implementing a communications protocol. In the embodiments described herein, a Universal Serial Bus (USB) connector and interface are described; however, it will be appreciated that other cables, connectors and protocols may be used in accordance with the embodiments described herein.

In one or more embodiments, the application processor 112 facilitates communications between the host device 110 and the connected device 130 using a multi-wire bus protocol including clock and data lines, such as defined by the SoundWire specification or the USB specification. The application processor 112 may communicate with the audio CODEC 114 in a master-slave relationship using an audio interface, such as SoundWire or another digital interface. The audio CODEC 114 facilitates communications between the application processor 112 and the interface components 116, translating the audio data between the two interface protocols. Audio data is transmitted between the interface components 116 and a device controller 140, which is configured to process data transmissions across the cable 120. The device controller 140 is further adapted to operate as a master device for communications with one or more slave devices, such as audio components 142 and audio components 144, across an interface bus of the connected device 130, and to facilitate other device functions, such as processing user inputs through user interface components 146. In one embodiment, the bus lines include a power bus (VBUS), a differential pair D+ and D− for data transmission, ground, and device ID. It will be appreciated by those skilled in the art that other bus line configurations may be used in accordance with the teachings of the present disclosure. Communications between various devices and components of system 100 may be facilitated in accordance with the digital data communications systems and methods disclosed herein.

Referring to FIG. 1B, an exemplary connected device 130 of FIG. 1A may be implemented as a USB headset 150, including a USB connector 152 for connecting to the interface components 116 of host device 110, a device controller housed in the connector 152, user interface 157 (such as buttons), and a wired data 158 bus connecting the device controller 152 with audio components 160 and 170. In one embodiment, the headset 150 is an adaptive noise cancellation (ANC) headset. Referring to FIG. 1C, an exemplary embodiment of the audio components 160 and 170 for use in an ANC headset is illustrated. The audio components 160/170 are implemented as slave devices on the data bus 158 of the headset 150. Each of the audio components 160/170 includes audio output circuitry 182 for receiving audio data from the slave component, and driving one or more speakers 186 to play the audio data for the user, and audio input circuitry 180 for receiving sensor data from one or more microphones 184, digitizing the received data and providing the digitized audio data to the slave for transmission to the master across the data bus 158.

Another embodiment of a connected device is illustrated in FIG. 2A. A connected device 230 includes a connector 216, a cable 220, a device controller 240, a user interface 246 and audio components 242 and 244. The connector 216 is adapted to couple with the interface components of a host device (such as interface components 116, of FIG. 1A). The cable 220 couples the connector 216 to the device controller 240 which provides an interface between the communications protocol used to communicate with the host device and the bus protocol of the connected device 230. The device controller 240 serves as a master of a communications bus coupling one or more slave devices, such as the audio components 242 and audio components 244. The user interface 246 is coupled to the device controller 240 to provide user controls (such as volume control or mute on a set of earphones).

Referring to FIG. 2B, an exemplary connected device 230 of FIG. 2A may be implemented as USB headset 250 (e.g., USB earphones), including a USB connector 252 for connecting to the interface components 116 of host device 110, a USB cable 254, a device controller 256, user interface 257 (such as buttons), and a wired data bus 258 connecting audio components 260 and 270 to the device controller 256.

The systems and methods of the present disclosure support long wired links, low power implementations and high bandwidth communications. In various embodiments, a low duty cycle is used for signals, which lowers the static power consumption associated with the terminated links In various aspects of the present disclosure, a low duty cycle is accomplished on a per symbol basis (e.g., by using short symbols) and/or by transmitting data packets quickly then letting the bus idle for a short time period. One advantage of these approaches is that a low latency link is supported because the data packets can be transferred quickly after which the bus goes idle and consumes little or no power. In one or more embodiments, the higher data rate is supported by incorporating an internal phase locked loop (PLL) or DLL (delay locked loop) in each receiving device to generate a higher speed internal clock based on regularly transmitted synchronization symbols. One advantage of using a low duty cycle for the symbols is that it allows for low power consumption for medium transfer rates, because the static power consumption from the use of a terminated link is reduced due to the low duty cycle. In other words, a link capable of a high baud rate using a terminated transmission line may be utilized to obtain low power consumption for medium to low speed signaling because the power consumption of various embodiments disclosed herein scales linearly with the bandwidth used (the power consumption from the receiving PLL used to receive data will be constant but can be made to be a small fraction of the total power budget). Thus, the data link implementations disclosed herein are capable of low power consumption when using medium to low bandwidth and are still able to transfer large amounts of data with slightly higher power consumption. In both cases, the PLL clock frequency or DLL delay may be constant or vary according to system needs.

The present disclosure further supports a multi-drop bus topology by providing controls at intermediate nodes allowing high quality signals to be obtained even when there are impedance mismatches at intermediate nodes that would lead to poor signal integrity in conventional systems. In many conventional systems this is solved by avoiding terminations at the end of the transmission line and instead controlling the slew-rate of the signals, however, this leads to slower systems due to the limitation of the maximum slew-rate possible to avoid reflections. Various systems and methods disclosed herein do not suffer from this limitation.

The embodiments disclosed herein provide robust and reliable data links with minimal degradation of the signal integrity. In some embodiments, the transmitter may disable its own parallel termination resistor while transmitting to reduce power consumption further. In some embodiments, the transmitter at each end of the bus transmission line may provide termination by setting the output level to a static value when not transmitting. By setting this voltage level to the static idle value of the system and match the series output impedance to the bus impedance (i.e. the output transmitter at each end are used as terminations when they are not transmitting), low power consumption will be achieved (e.g., no power consumption except for running of internal clock, etc.) when there is not transmitted data). In conventional systems, a change in impedance in a transmission line will result in reflections in the signals transmitted. This fact has resulted in conventional systems adhering to design constrains based on the notion that multiple components cannot easily be placed on intermediate nodes on a transmission line without severely distorting the transmitted signals.

In the present disclosure, however, it is recognized that if the change in impedance happens over a relatively short distance compared to the shortest wavelengths involved, there will be very little disturbance of the signals and a practical system may be implemented. As an example, an experimental system using a 50 Ohm transmission line included multiple intermediate nodes, each involving small stubs (1-2 cm in length), and this resulted in the change of the slew-rate from 4.7 ns to 4.8 ns (or about a 100 ps increase) and an amplitude reduction of about 6% for each node. Thus, even though the slew rate increased slightly and the amplitude was reduced a bit, the change in the signals was minimal, a good eye diagram was obtained, and a robust data transfer was achieved. Therefore, even though conventional theory has led to system requirements prohibiting any change of impedance along a transmission line to avoid reflections, these reflections can be controlled to be of such small magnitude that they are not detrimental to a practical functioning system as long as the length of these disturbances are much shorter than the wavelengths of the fastest signals involved.

The experimental system had a stub length of 2 cm, which is equal to a transmission time of less than 0.1 ns in air, or much shorter than the rise time (5 ns). In this case the factor between the rise time and delay by the stub was more than 50 and led to minimal delays and disturbances in the system. If the delay had been 5 ns (equivalent to 150 cm of cable without shielding), the system the rise time and delay in the system would be comparable and the cable would appear open-ended. Thus, dimensioned as disclosed herein, one or more systems of the present disclosure will allow the transmission of very fast signals that are properly terminated at the end of a transmission line and simultaneously allow multiple components to reside on the same transmission line, thereby solving the problem of obtaining a multi-drop bus system that still allows high transmission speed. Furthermore, by timing the sequencing of the transmission of signals so that either a forward wave or backward wave is being controlled, it is possible to avoid problems with active transmitters residing on intermediate nodes on the transmission line that disturb travelling waves.

Figure 3:
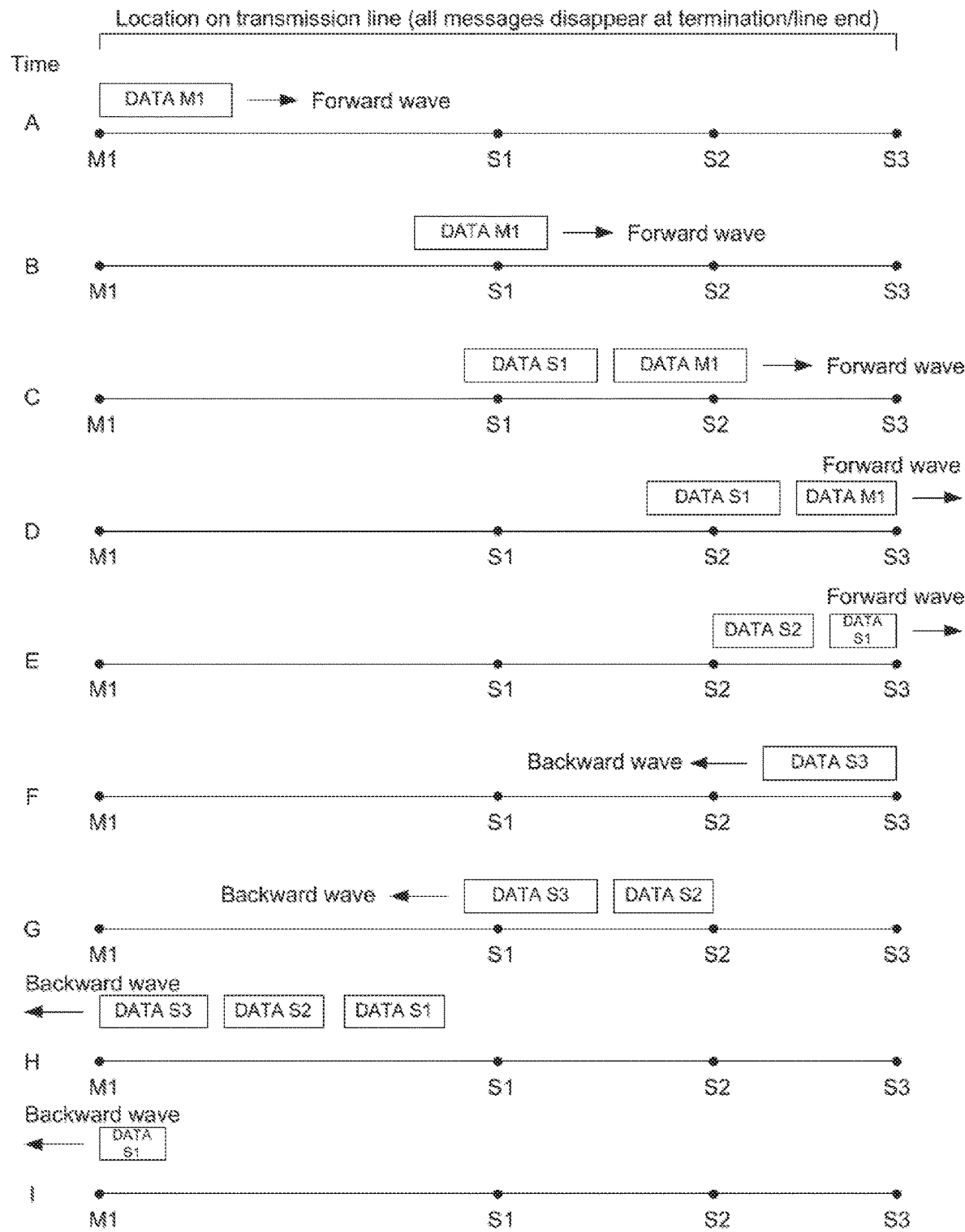
FIG. 3 illustrates an exemplary timing sequence in accordance with one or more embodiments.

An example of a timing sequence in accordance with one or more embodiments will now be described with reference to FIG. 3, which shows information travelling between a master device and 3 slave devices. By optimizing the timing related to the direction of the data transfer, higher bandwidth can be obtained. In various embodiments, all data packages will disappear once they reach the termination at the line ends, where they are absorbed. Assume a master M1 is located at the end of a transmission line with multiple slave devices (S1, S2 and S3) located on the same transmission line, with slave devices labeled number one, two, three, etc., as each slave device is further away from the master device.

When sending a forward travelling wave from the master, the master M1 sends a message first (Time A), immediately followed by slave device S1 when the forward wave has just passed slave device S1 (Time C), then slave device S2 sends its forward travelling wave message when the end of the message from slave device S1 has been completed (Time E). Slave device S3 sends a forward travelling wave message when the message from slave device S2 has been completed. When all forward travelling wave messages have been completed and absorbed by the termination at the other end of the transmission line, the last device residing on the transmission line (e.g., slave device S3 at Time F) begins to transmit a backward travelling wave towards the master M1. This backward travelling wave is followed by a transmission of a backward travelling wave from the second to last device (e.g., slave device S2 at Time G) residing on the transmission line, just after the message from the last device has passed, and so on. When all backward travelling wave messages have been completed and absorbed by the termination at the master device, the master M1 would again begin to transmit messages using a forward travelling wave as previously described.

In some embodiments, two devices may be transmitting messages simultaneously if these devices are located the opposite ends of the transmission line and the influence of its own transmitting wave is subtracted from the measured wave (the superposition of the forward and backward travelling wave). In some embodiments, this may also be performed even with devices located on intermediate points of the transmission line, however in some embodiments a device located on intermediate points should generally not transmit at the same time as receiving because this could lead to reflections of the forward or backward travelling wave.

In various embodiments, a communications bus for use with audio devices, such as audio headsets, includes a multi-drop bus using differential impedance matched signaling to enable high bandwidth and low power consumption. The bus has high control and audio bandwidth and supports links up to more than 10 meters. In one or more embodiments, the total bus link length is two meters or less. Referring to FIG. 1A, the link length is the length of the wires between the two termination endpoints, $Z_{END}$, and includes the length of the cable 120 from the device controller 140, which may be integrated into the connector, to the user interface components 146 (Length A), the length of the wires from the user interface components 146 to the intermediate nodes (Length B1 & Length B2), and the length of the wires from the intermediate nodes to the termination end point (Length C1 and Length C2). In one embodiment, the links have a total length of 0-200 cm from termination endpoints, including the following ranges: Length A, 0-80 cm; Length B, 0-60 cm; and Length C, 0-60 cm. In one embodiment, the stubs B2 and C2 should be kept as short as possible to minimize the impact on the signal integrity.

Referring to FIG. 2A, in one embodiment the length of the USB cable is from 0-200 cm and the link length between each termination end point and the device controller 240 is from 0-100 cm each. In the illustrated embodiments, the link between the terminal end of the headset and the farthest speaker or microphone is less than 200 cm, but other distances may be used.

In various embodiments, the link supports standard clock rates, such as 12.288 MHz and 19.200 MHz, thereby providing compatibility with standard telecommunication and audio systems. In one embodiment, a linked distance of 10 meters is supported in the 12.288 MHz mode of operation by increasing the turn-around delay when switching signaling direction.

In various embodiments, it is desirable that the lock-in range of the PLL be narrow, and to maintain a constant number of bits between each sync symbol. Further, in various embodiments it is desirable to maintain 48 kHz compatibility with multiple clock systems. The present disclosure provides an initial synchronization between slave and master devices that is simple and robust and, in various embodiments, uses a constant frame size. The use of a constant frame size is in contrast to SoundWire and similar protocols, which enable multiple frame sizes to ensure compatibility with multiple clock systems. In one or more embodiments, one or more beacon bits are signaled within the frame to maintain synchronization between multiple sources such as multiple audio ports utilizing different sampling frequencies.

Exemplary operational modes in accordance with one or more embodiments of the present disclosure are illustrated in the table, below:

| Mode name | Telecom | USB | Audio | Unit |
|---|---|---|---|---|
| Main audio clock | 9.600 | 12.000 | 12.288 | MHz |
| Bus length (min) | 0 | 0 | 0 | m |
| Bus length (max) | 2.0 | 2.1 | 2.1 | m |
| Bandwidth master to slave | 51.200 | 48.000 | 49.152 | Mbaud |
| Bandwidth slave to master | 51.200 | 48.000 | 49.152 | Mbaud |
| Control bandwidth | 6.400 | 6.000 | 6.144 | Mbaud |
| Control words | 32 | 32 | 32 | Bits |
| Control update | 200 | 187.5 | 192 | kHz |
| Bitrate link | 134.400 | 126.000 | 129.024 | MHz |
| PLL, typical | 268.800 | 252.000 | 258.048 | MHz |
| PLL reference frequency | 3200 | 3000 | 3072 | kHz |
| PLL power consumption, approximately | 250 | 230 | 240 | □W |
| Spacing between sync symbols | 42 | 42 | 42 | Bits |
| Data latency master or slave (one row) | 313 | 333 | 326 | ns |

The systems and methods disclosed herein provide additional advantages including energy efficient design, solves some of the problems with sync symbols interfering with frame size, includes an efficient bandwidth utilization scheme by merging sync columns with commands, has a simple clocking scheme, uses a single clock source, enables fine-tuning of delays for optimal signal integrity, supports 12.288, 19.200 and 12.000 MHz systems, wideband PLL tracking (i.e. the PLL only needs to support a relatively narrow lock-in range) is not being required, a constant frame size may be used with a varying data format to support multiple clock systems, and accurate measurement of slave delays using micro-stepping of sample interval for optimization of the eye diagram while receiving data. In various embodiments, the multi-drop bus may be used for multiple clock systems, such as telecom, USB, and audio modes of operation, for example, while maintaining a constant frame length. In some cases, a lower synchronization frequency such as 768 kHz may be used for longer a bus diameter.

The synchronization symbols may be merged with the signaling of commands by careful timing of the slave delays, so that the time-slot after the master has completed a synchronization symbol (typically a 0-1 transition) may be used for signaling a command or to allow multiple devices to respond within the same time-slot by leaving this time-slot undriven and allowing devices to change the current level, but not to drive the current level (similar to a wired-or configuration).

Clock Support

As previously discussed, one problem encountered with conventional bus topologies relates to support for different clock frequencies, including multipliers or dividers that are needed to get the desired base frequencies. As an example, 48 kHz can be obtained by dividing 19.200 MHz by 400 (4×5×5) or 12.288 MHz by 256 (4×4×4×4). In various embodiments disclosed herein, commands transmitted on the bus do not impede audio flow. In one embodiment, the commands are issued with the same cadence as the audio data (or a submultiple thereof). In some embodiments, there is a constraint of PLL or DLL clock synchronization to embed the clock in the data line and thereby save wires and power consumption. By using differential signaling, electromagnetic interference (EMI) can be constrained.

In one embodiment, a solution is provided that includes adding extra bits to give space for synchronization and commands within a communications frame. The system can support various clock frequencies, and the frame structure may be optimized with respect to bandwidth utilization given constraints of a long bus diameter. The structure of this embodiment is determinate and simple to decode, and does not require complicated analog circuits to determine the exact clock frequency, e.g., the number of clock pulses between each sync symbol frame stays constant.

Existing systems, such as SoundWire, contain a variety of defined frame formats—e.g., 8 column sizes and 19 possible row values for a total of 152 combinations. One challenge is to design a system that supports both 12.288 MHz and 19.200 MHz operation because each has different multipliers (19200/48=400 and 12288/48=256), without needing special analog systems. In various embodiments described herein, a single frame size may be used that allows support for both 12.288 and 19.200 and even 12.000 MHz systems.

The PLL and clocking solutions disclosed herein solve various problems associated with conventional systems. When there is an unterminated transmission line there are reflections, which can disturb signal quality. One solution is to slow down data transmissions. However, for many systems high speed transmission is desired and, therefore, a terminated line is preferred to eliminate unwanted reflections. By using a high clock speed and a low duty cycle for the data (either for each symbol or as an idle space at the end of each cycle/line), it is possible to reduce the static power consumption per transmitted bit and thereby get lower power consumption for medium speed links.

When there are only two devices, synchronization between devices is simplified because there is no cross traffic. Furthermore, such systems may not need terminations at each end, because the two devices will not experience any half-voltages as these devices are located at the ends of the transmission line. With multiple devices, there is a possibility that a slave device will lose lock on the master device. One solution is to restart the bus, but that is not desirable for many implementations because the system will lose audio for a period of time. Various embodiments of the present disclosure address the problem of a slave device that has lost synchronization by resolving the clock synchronization while other devices on the bus continue operating.

Figure 4:
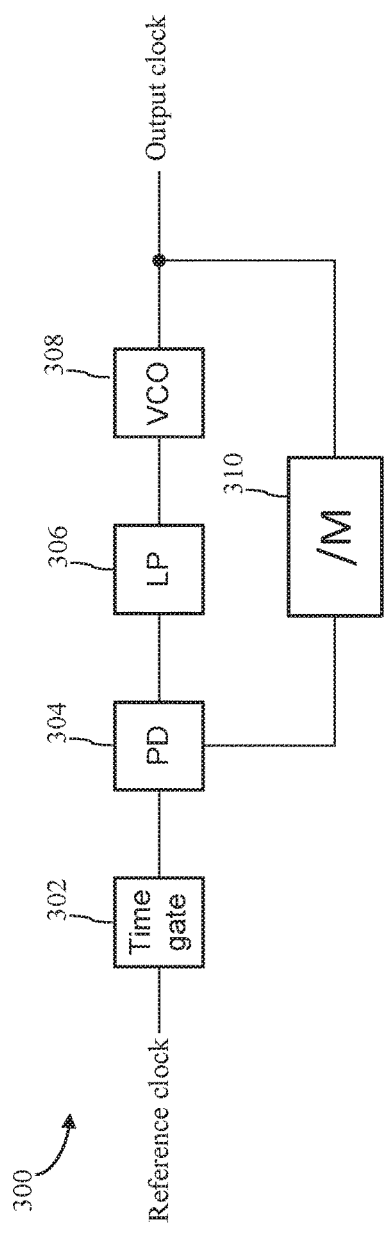
FIG. 4 illustrates an exemplary time gated phase locked-loop (PLL) in accordance with one or more embodiments.

Referring to FIG. 4, an exemplary phase locked loop (PLL) 300, which may be included in the device controller 140 of FIG. 1A and device controller 240 of FIG. 2A, and the slave devices 142 and 144 of FIG. 1A and 242 and 244 of FIG. 2A, will now be described. The PLL 300 allows the circuit to maintain lock, even in the presence of signals from multiple slave devices that are time-multiplexed together with the main synchronization signal.

The PLL 300 (or DLL) generates an output clock signal having a phase and frequency relative to the phase and frequency of an input reference clock. During operation, the reference clock signal, through time gate 302, and a feedback signal from a divider 310 are input into a phase detector 304. The phase detector 304 compares the phases and frequencies of the input reference clock signal and the feedback signal, and outputs a control signal to adjust the feedback signal accordingly to have a phase and frequency synchronized with the phase and frequency of the reference clock signal. The phase detector 304 aligns the phases of the rising (or falling) edges of the reference clock signal and the feedback signal. The phase detector 304 output is provided to a loop filter 306 to adjust the voltage and frequency of a voltage-controlled oscillator (VCO) 308. The signal output from the VCO 308 is passed through divider 310 to produce the feedback signal. The output clock signal is provided to various system components as described herein. In the illustrated embodiment, the divider is configured to be a multiple of the frame size of 144 bits, but other integer values (e.g., M=16, M=42, M=48 or M=80) could be chosen. Using M=4 gives 4 time slots directly, or 8 time slots using both phases of the clock for the data capture of bus signals. Using M=8 give 8 time slots directly or 16 time slots using both phases, which provides a simple solution with high resolution.

In various embodiments, the time gate 302 is enabled all the time during initial startup after which it is only enabled during the reception of a reference sync pulse from the master device. This enables the circuit to be locked to the master even if multiple slave devices are also signaling on the bus and these are offset in time with the master. Furthermore, if the PLL/DLL loses lock with master synchronization, the device will disable the output drivers to avoid bus collision and re-enable a wide search for the sync pulses. In some embodiments, the phase detector may be eliminated altogether, by using the time gate as a phase detector (e.g., by using a sufficiently narrow time window). This may be used to reduce timing jitter (the time gate will still be controlled by the output from the VCO through a divider). In some embodiments, the phase detector will be of a phase-frequency type, so it is sensitive to both frequency and phase differences (type III-IV phase detector) thereby ensuring safe initial acquisition of the correct state.

Figure 5A:
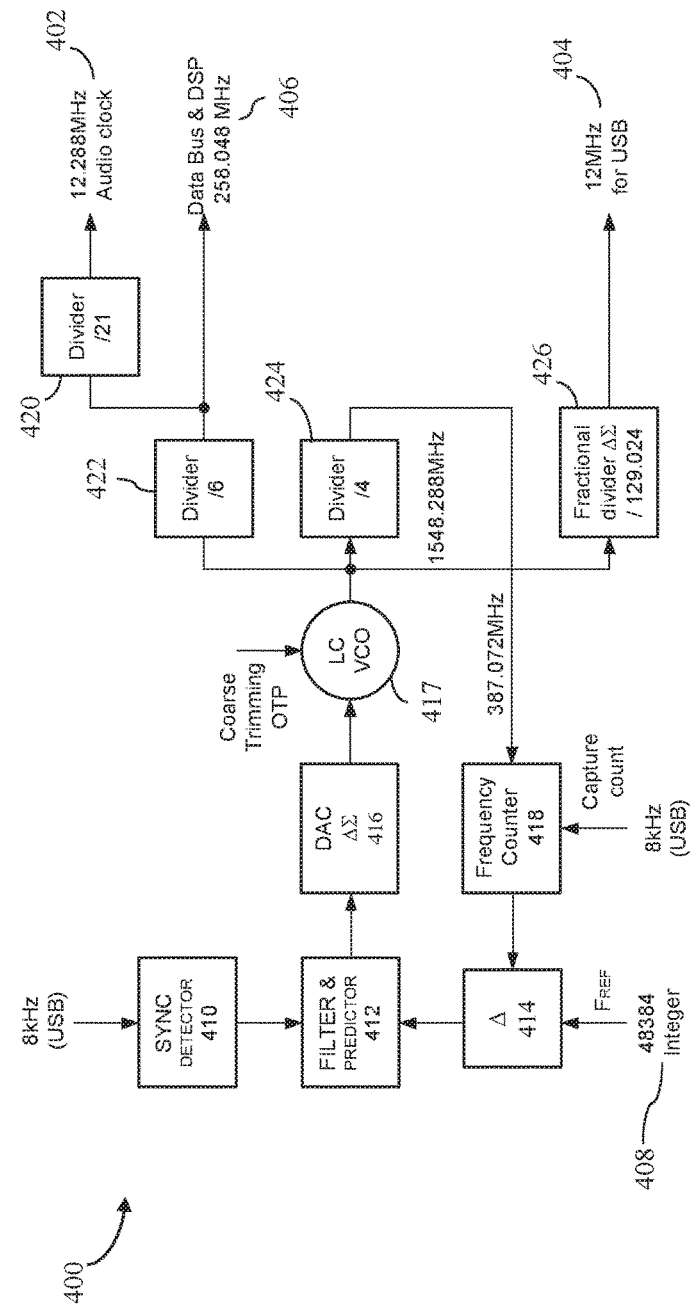
FIGS. 5A and 5B illustrate an exemplary clock solution in accordance with one or more embodiments.

Exemplary clock dividing solutions for use with embodiments of the present disclosure will now be described. In one embodiment, illustrated in FIGS. 5A and 5B, a clock solution is an implementation of a frequency locked loop (FLL) 400 that generates three synchronized clock signals, an audio clock 402 used for audio input and output processing, USB clock 404 used for USB communications between the host device and the connected device, and a data bus and DSP clock 406 for use in the low latency data bus of the present disclosure. The sync pulse present in the USB protocol may be used as a timing reference.

Figure 5B:
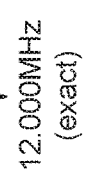

In the illustrated embodiment, a sync detector 410 is coupled to the input of the FLL 400. The sync detector 410 determines whether the clock signal is in sync with the system clock (USB clock reference) to allow for proper bus communications. If a sync symbol arrives out of sync, the sync detector 410 will cause the FLL 400 to modify the clock cycle to bring it into sync with the master clock. The FLL 400 may be implemented as illustrated including a digital filter and predictor 412, a digital-to-analog converter (DAC) 414, such as a Delta-Sigma DAC, a voltage controlled oscillator (VCO) 417, divider 424, frequency counter 418 and subtractor block 414 to compare the results with the reference frequency 408. Another aspect of the illustrated embodiment is the use of reference frequency integer, 48384 (see reference 408), which may be used to cause the FLL 400 to produce the desired divided frequencies using divider 420, divider 422, and fractional divider 426. An embodiment of a fractional divider 430 is illustrated in FIG. 5B that may be used to divide a clock signal by a fractional value. The fractional divider 430 is implemented using a phase adder 432 and divider 434, where a certain phase value is added to a phase sum for each clock cycle and when the current phase sum exceeds a certain maximum phase value, another phase value is subtracted from the current sum and an output is activated. If a two-complement adder is used, the phase value may be taken as $2^N$ steps and no subtraction is needed due to the automatic wrap-around happening in two's complement arithmetic. In some embodiments, a delta-sigma converter may perform the integration instead of the phase-adder thereby eliminating spurs resulting from the fractional division. This may be used for 'lower EMI of the output clock signal by spreading the output spectrum.

Exemplary clock solutions for various embodiments of the present disclosure are illustrated in the table, below. As used herein, the term "EarLink" refers to the audio bus systems and methods of the present disclosure.

| Parameter | Solution 1 | Solution 2 | Solution 3 | Solution 4 |
| --- | --- | --- | --- | --- |
| Main clock [MHz] | 1548.288 | 1548.288 | 1536.000 | 1536.000 |
| Audio clock 12.288 MHz | Divide EarLink clock by 21 | Divide EarLink clock by 21 | Divide main clock by 125 | Divide EarLink clock by 21 |
| USB clock 12.000 MHz | Fractional divide of main clock, factor = 63 × 256/125 | Use audio clock times 125/128 (extra PLL) | Divide main clock by 128 | Divide main clock by 128 |
| EarLink 258.048 MHz | Divide main clock by 6 | Divide main clock by 6 | Multiply audio clock times 21 (extra PLL) | Fractional divide of main, factor 3 × 125/63 |
| Advantages | Single VCO no new analog IP | No fractional divider needed | Cleanest USB clock, simple extra PLL | Single VCO, lower EMI |

-continued

| Parameter | Solution 1 | Solution 2 | Solution 3 | Solution 4 |
|---|---|---|---|---|
| Disadvantages | Fractional divider needs to run at high speed, higher jitter USB | Extra PLL needed, higher jitter USB | Extra PLL needed, higher jitter EarLink | Fractional divider needs to run at high speed, higher jitter EarLink |
| Jitter (audio) | Low | Low | Add 100 ps (approx.) | Add 94 ps |
| Jitter (USB) | Extra 93 ps | Extra 100 ps (approx.) | Low | Low |
| Jitter (EarLink) | Low | Low | Add 100 ps (approx.) | Add 94 ps |
| Silicon area | Lowest | Low | Low | Lowest |
| Power consumption | Lowest | Low | Low | Lowest |

Figure 6A:
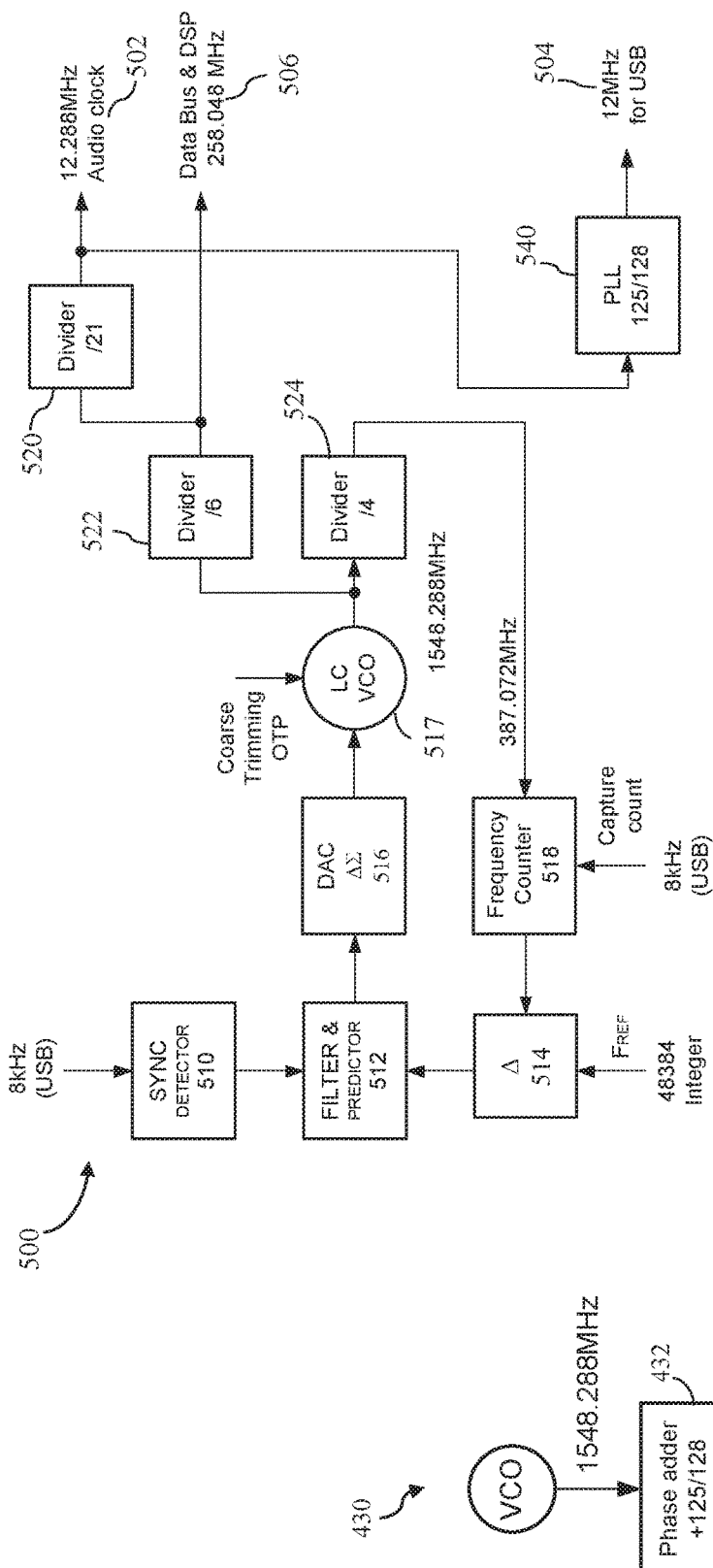
FIGS. 6A and 6B illustrate an exemplary clock solution in accordance with one or more embodiments.
Figure 6B:
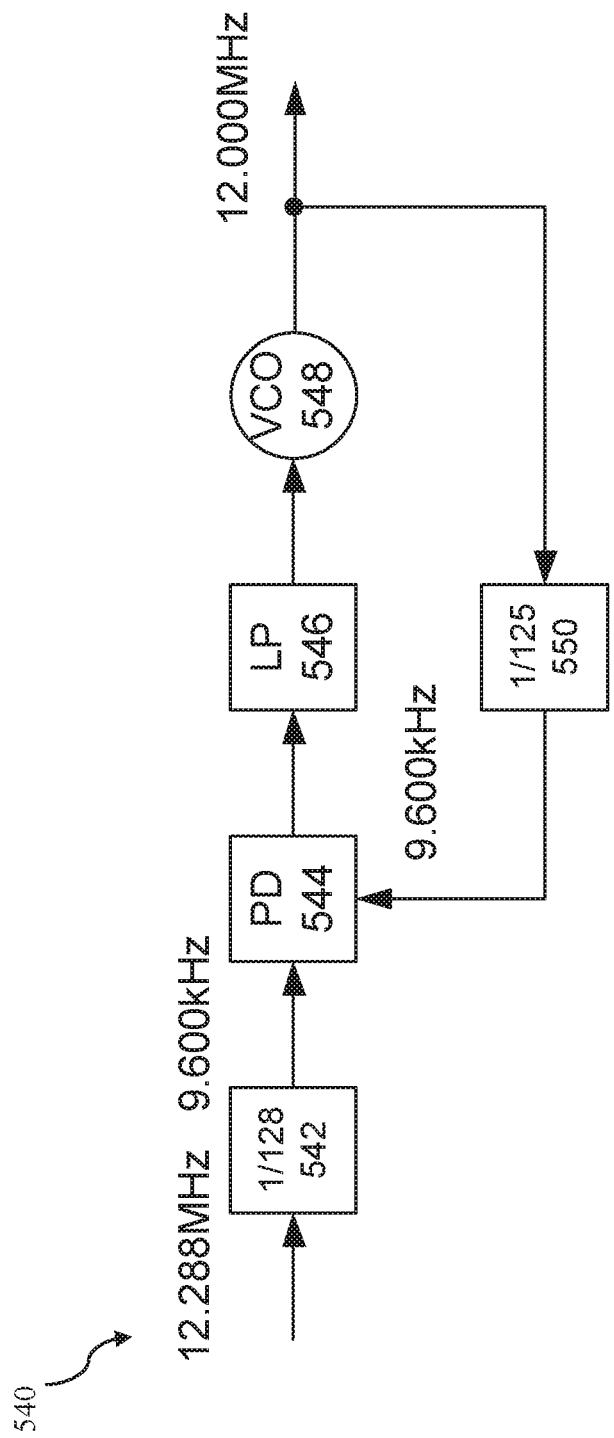

An exemplary embodiment of a second clock solution is illustrated in FIGS. 6A and 6B. The second clock solution is an implementation of a frequency locked loop (FLL) 500 that generates three synchronized clock signals, an audio clock 502 used for audio input and output processing, USB clock 504 used for USB communications between the host device and the connected device, and a data bus and DSP clock 506 for use in the low latency data bus of the present disclosure. The FLL 500 includes a sync detector 510, filter and predictor 512, Delta-Sigma DAC 516, VCO 517, divider 524, frequency counter 518 and subtractor block 514, which may be implemented in a similar fashion to corresponding components of FIGS. 5A and 5B, except as described herein. The FLL 400 produces the desired divided frequencies using divider 520, divider 522, and PLL 540, which outputs a frequency at 125/128 of the audio clock frequency. An embodiment of the PLL 540 is illustrated in FIG. 6B and includes a 1/128 reference input from the output of divider 520, a phase detector 544, loop filter 546, VCO 548 and 1/125 divider 550.

Figure 7:
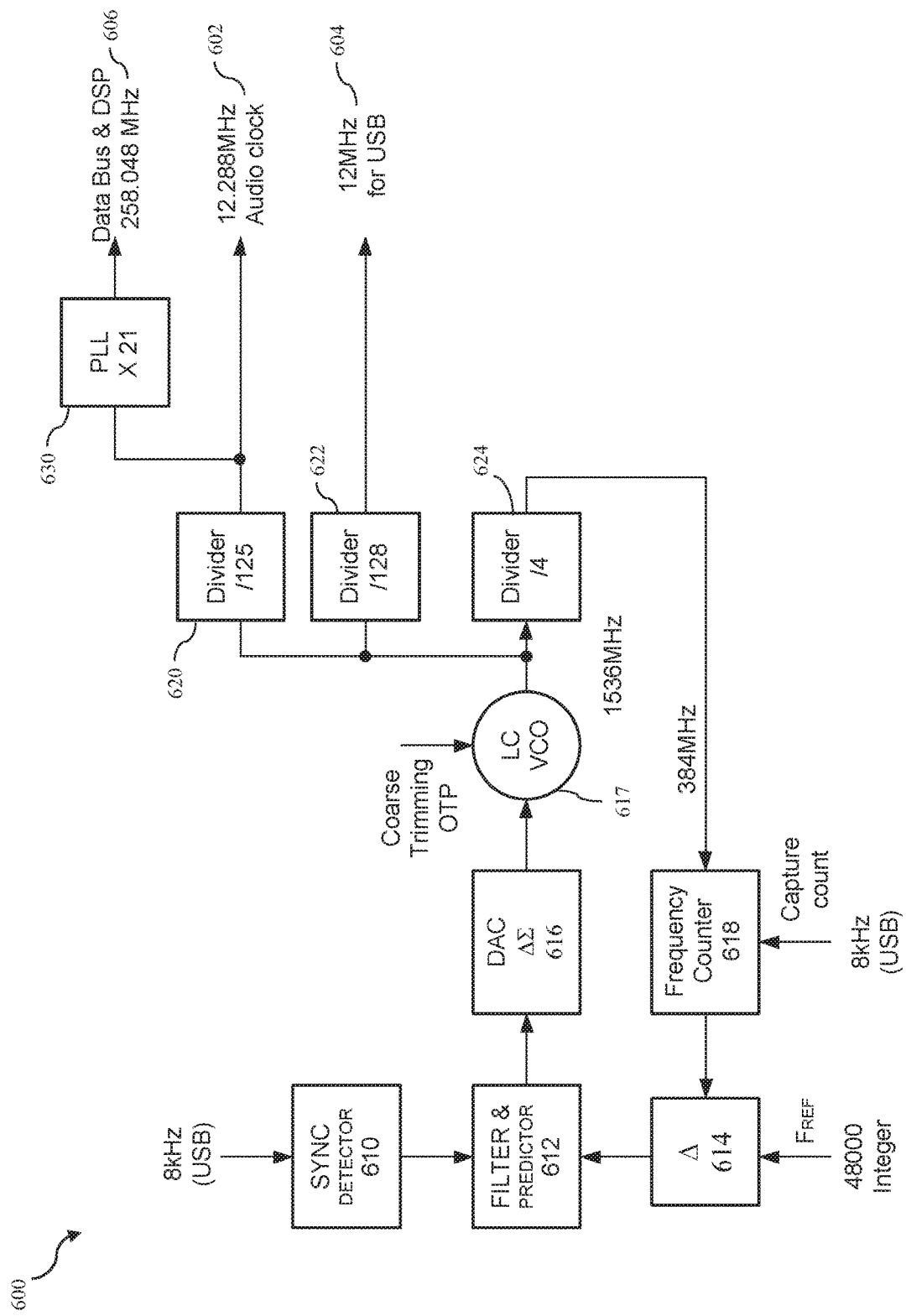
FIG. 7 illustrates an exemplary clock solution in accordance with one or more embodiments.

An exemplary embodiment of a third clock solution is illustrated in FIG. 7. The third clock solution is an implementation of a frequency locked loop (FLL) 600 that generates three synchronized clock signals, an audio clock 602 used for audio input and output processing, USB clock 604 used for USB communications between the host device and the connected device, and a data bus and DSP clock 606 for use in the low latency data bus of the present disclosure. The FLL 600 includes a sync detector 610, filter and predictor 612, Delta-Sigma DAC 616, VCO 617, divider 624, frequency counter 618 and subtractor block 614, which may be implemented in a similar fashion to corresponding components of FIGS. 5A and 5B and FIG. 6, except as described herein. The FLL 600 produces the desired divided frequencies using divider 620, divider 622, and PLL 630, which outputs a frequency at 21 times the audio clock frequency.

Figures 8A, 8B:
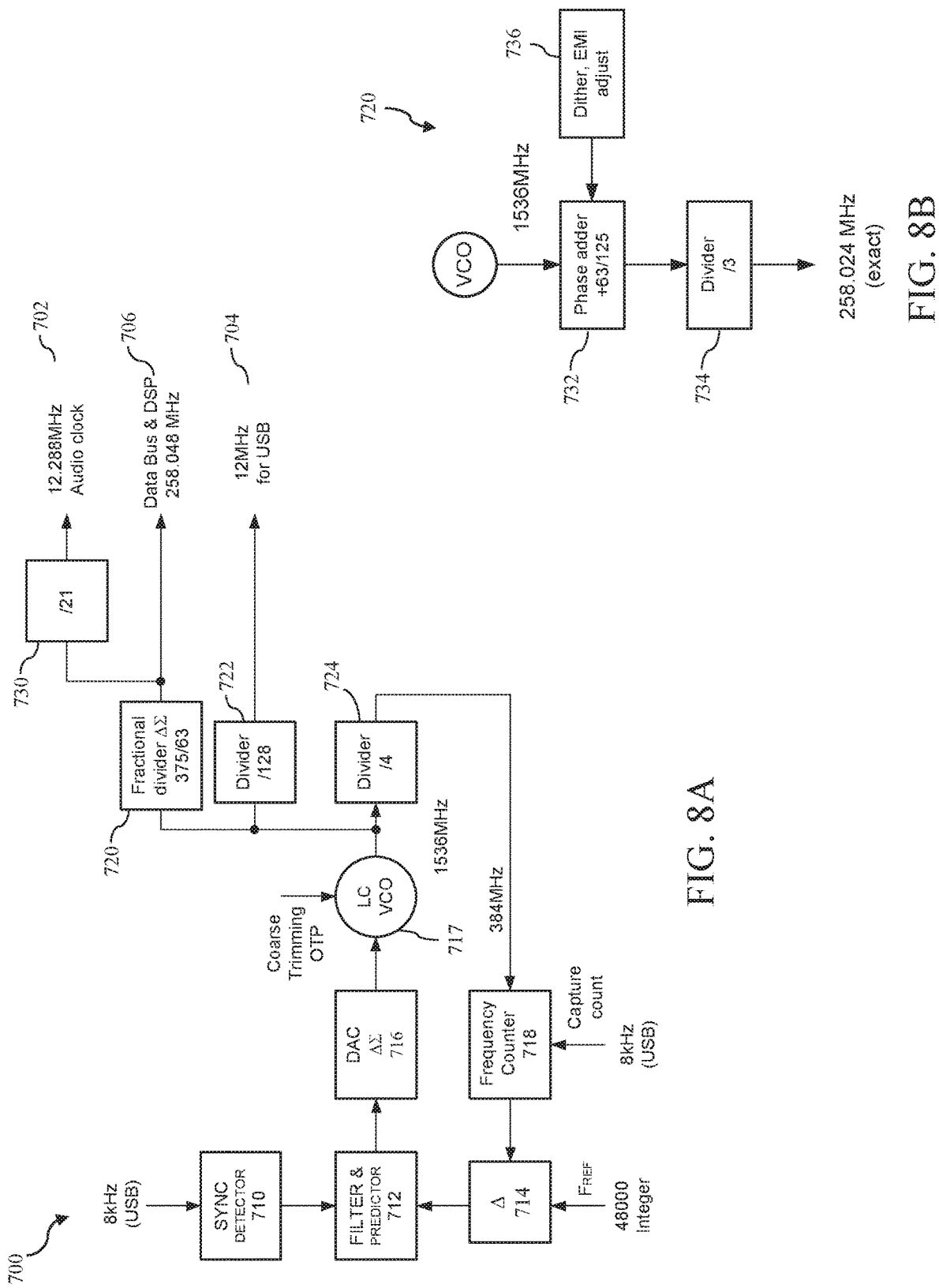
FIGS. 8A and 8B illustrate an exemplary clock solution in accordance with one or more embodiments.

An exemplary embodiment of a fourth clock solution is illustrated in FIGS. 8A and 8B. The fourth clock solution is an implementation of a frequency locked loop (FLL) 700 that generates three synchronized clock signals, an audio clock signal 702 at 12.288 MHz used for audio input and output processing, a USB clock signal 704 at 12 MHz used for USB communications between the host device and the connected device, and a data bus and DSP clock signal 706 at 258.048 MHz for use in the low latency data bus of the present disclosure. The FLL 700 includes a sync detector 710, filter and predictor 712, Delta-Sigma DAC 716, VCO 717, divider 724, frequency counter 718 and subtractor block 714, which may be implemented in a similar fashion to corresponding components of FIGS. 5-7, except as described herein. The FLL 700 produces the desired divided frequencies using fractional divider 720, divider 722, and fractional divider 730, which outputs a frequency at 21× of the audio clock signal 702. An embodiment of a fractional divider 720 is illustrated in FIG. 8B that may be used to generate the data bus and DSP clock signal 706. The fractional divider 720 is implemented using a phase adder 732 and divider 734, where a certain phase value is added to a phase sum for each clock cycle and when the current phase sum exceeds a certain maximum phase value, another phase value is subtracted from the phase sum and an output is activated. In some cases, dither generator 736 provides dithering of the phase adder to not only divide the clock by a fractional value but further add a dither value to the intermediate phase value. This will increase the jitter of the clock but can be used to reduce the EMI of the system clock by controlling the amount of dither added. Typically, the emitted EMI will be lowered by 15-20 dB by this action. The dither generator 736 may be implemented using a digital pseudorandom generator or other digital circuit generating random numbers. If the pseudorandom generator adds an average value to the phase adder sequence that is different from zero, this should be taken into account when updating the phase adder.

Frame Structure

In accordance with various embodiments of the present disclosure, a single frame structure may be used across multiple supported frequencies. Exemplary frame structures for use with the disclosed embodiments will now be described.

Referring to the embodiment of FIG. 9A, a frame structure includes frames having a constant size of 42 bits, with a synchronization pattern repeating with a frequency of once per frame. In one embodiment, the number of command bits per message is 32 bits, and the message synchronization bit repeats once every 48 kHz. Each frame may comprise one or more subframes, e.g. four and each subframe has the same structure and looks the same with respect to synchronization. An exemplary organization of command bits is illustrated below, where SCMD is start of command, S48 is a 48 kHz beacon, RES is a reserved field, OP2-OP0 is a three bit opcode, DEV3-0 is a 4 bit device number, DAT is data to be transferred as part of the command, PAR is a parity bit for security and ACK is an acknowledgment bit:

| SCMD | S48 | RES | OP2 | OP1 | OP0 | DEV3-0 | DAT | PAR | ACK |
|------|-----|-----|-----|-----|-----|--------|-----|-----|-----|

The bit S is equal to one at the start of the first subframe for every 48 kHz time tick or every $64^{th}$ frame or 256 subframes (for 9.600 MHz system, for every 24 kHz time tick or 512 subframes). The S bit may be used to find the start of a frame and to synchronize multiple sound sources to 48 kHz (e.g., the start of the first frame should be the sample event).

Details of the data organization are further illustrated in FIG. 9A. A zero to one transition is used by the PLL in a slave device to synchronize the internal timing to the master, followed by command bits, CMD. Next, 16 bits of audio may be transferred from the master device to the slave device, followed by one or more time-slot delays (to allow a change in the signal direction) during handover from the master device to the slave device (including a read, R, command). Next, 16 bits of audio may be transferred from the slave device to the master device followed by one or more time-slot delays.

Embodiments for 9.600 MHz, 12.000 MHz and 16.000 MHz systems are illustrated in FIGS. 9B and 9C. These formats will enable support for telecom clocks and can vary the utilized bandwidth between master and slave, from about ⅓ to ⅔ of the bandwidth used by the master or by the slave. These formats have the advantage that the number of bits per row is 10 or slightly more, for more efficient transfers at clock frequencies related to 19.200 MHz. This frequency or 38.40 MHz=2*19.20 MHz is often used in telecom applications such as mobile phones and handheld devices.

Referring to FIGS. 9D and 9E additional frame structures will be described. In accordance with various embodiments, the same number of bits is present in each frame between each synchronization pulse. However, the number of bits can be varied, for example, by changing the amount of bandwidth used for commands. The frame structure can also be varied in the number of rows and columns and still maintain the same number of bits. Both FIGS. 9D and 9E, for example, include the same number of bits per frame. By dividing by a larger number of bits per frame (e.g., 80 or 144 bits) that can be broken into various factors, the frame organization can be changed without changing the PLL multiplication factor, at the expense of higher jitter in the receive eye opening due to the higher bandwidth.

An organization of an exemplary message field is illustrated below:

| Opcode | MM3 | MM2 | MM1 | MM0 | Instruction functionality |
|--------|-----|-----|-----|-----|---------------------------|
| NOP    | 0   | 0   | 0   | 0   | Do nothing |
| RD     | 0   | 0   | 0   | 1   | Read register from device |
| RDINC  | 0   | 0   | 1   | 0   | Read register and increment address register |
| WR     | 0   | 0   | 1   | 1   | Write register in device |
| WRINC  | 0   | 1   | 0   | 0   | Write register and increment address register |
| DELAY  | 0   | 1   | 0   | Device loop delay | Delay response from a single device |
| SETDEV | 0   | 1   | 1   | Set device address | After identifying a device, this command will assign a new device number to the device (0-7, include the transmit delay value) |
| SEL    | 0   | 1   | 1   | Selective response | This will use a selective device response to identify devices, use multiple reads from multiple devices |
| DEVAD  | 1   | DEV2 | DEV1 | DEV0 | Select device and update the I/O address register |

It will be appreciated that while many of the commands may be conventional (do nothing, read and write of registers), a DELAY command may be used to find the delay between devices attached to the transmission line for optimal timing. This can be accomplished by the master first charging the line to a certain value, then keeping this value with a bus holder or utilizing a floating bus, after which the main driver is released and after which any device attached to the bus can toggle this value. The device located closest to the master will first affect the toggling of the bus line, which may be reliably measured using a counter clocked at a high speed that detects the timing event or using multiple delay circuits. During the measurement the bus will not be terminated in order to not affect the timing. The measurement can take place inside the master (to optimize slave transmit timing) or inside a slave device (to optimize slave-to-slave communication timing).

FIG. 9F illustrates exemplary protocol symbols in accordance with various embodiments. Another set of exemplary commands are further illustrated in the table, below:

| Command value | | | Command | |
|---|---|---|---|---|
| OP2 | OP1 | OP0 | name | Description |
| 0 | 0 | 0 | Read | The current address value is used for a read operation, data returned and the internal address is incremented afterwards. |

| Command value | | | Command | |
|---|---|---|---|---|
| OP2 | OP1 | OP0 | name | Description |
| 0 | 0 | 1 | Write | The current address value is used for a write operation, data is written and the internal address is incremented afterwards. |
| 0 | 1 | 0 | Device address register | The data field will set the device address register to prepare for read or write operations |
| 0 | 1 | 1 | Beacon | Beacon signal for multisource and frame synchronization. Repeated at a frequency of 8 kHz. Start of next frame is the synchronization point. |
| 1 | 0 | 0 | Device loop delay | Delay response from a single device |
| 1 | 0 | 1 | Set device address | After identifying a device, this command will assign a new device number to the device (0-7, including a delay value) |
| 1 | 1 | 0 | Selective response | This will use a selective device response to identify devices, use multiple reads from multiple devices |
| 1 | 1 | 1 | Reserved | Reserved |

An embodiment of the "register read operation" will now be described. In order to perform a register read operation, the following sequence may be performed: (i) write the correct address value using the address write operation, and (ii) perform a register read operation (the data field will contain the read value). If a range of registers needs to be read, this can be accomplished without updating the address register between every read operation. This is possible because the address counter may be incremented by one for every read operation.

An embodiment of the "register write operation" will now be described. In order to perform a register write operation, the following sequence may be performed: (i) write the correct address value using the address write operation, and (ii) perform a register write operation (the data field will contain the read value). If a range of registers is to be written, this can be accomplished without updating the address register between every write operation. This is possible because the address counter may be incremented by one for every write operation.

An embodiment of the "address register write operation" will now be described. Register accesses are controlled by the address register. Before performing a register operation, the value of the address register is first defined. This happens with the address register write operation. The address register points to the current active register in the addressed slave device. Subsequent access (either read or write operation) may increment the address register. This enables faster access to multiple registers. In various embodiments, there is only a single register controlling both the read and write operation and any read or write operation may increment the value of this address register. The increment takes place after the value of the address register has first been used once in a read or write operation. The current value of the address register cannot be read back using the commands shown in the table.

An embodiment of a "beacon" command will now be described. This command may be sent out by the master with a repetition period of 48 kHz. It may be used by slaves to synchronize audio timing to the start of a frame so that all audio sources are synchronized.

Figure 10A:
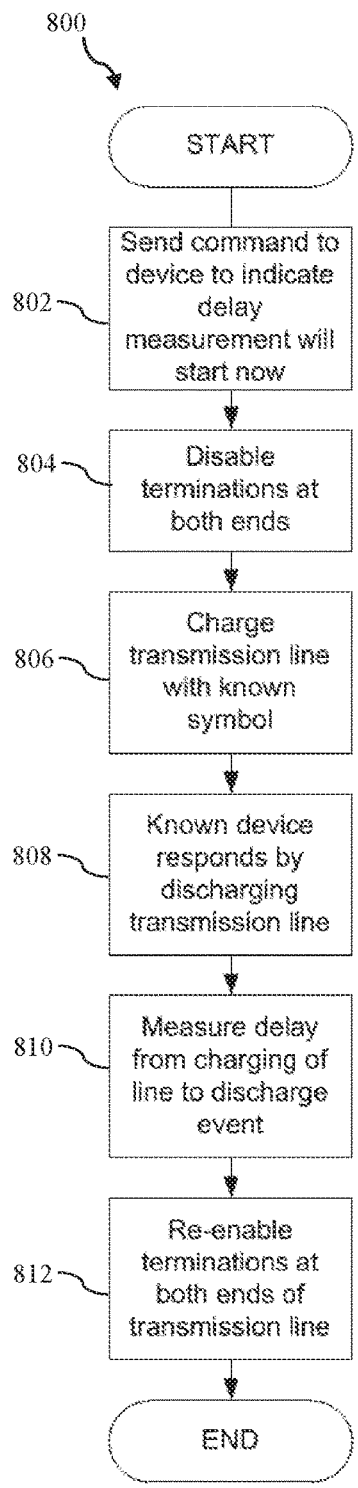
FIG. 10A illustrates a method for delay measurement of attached devices in accordance with one or more embodiments.

An embodiment of a "device loop delay" command will now be described. This command measures the turn-around delay from a slave device to the master by measuring a transition initiated by a slave device and travelling to the master. In the present embodiment a mechanism for measuring the two-path delay is provided. An embodiment of a method 800 for delay measurement will now be described with reference to FIG. 10A. First, the master sends a command to a device to indicate that delay measurement will start (step 802). Next, the terminations are disabled at both ends (step 804) and the transmission line is charged with a known symbol (step 806). A known device responds by discharging the transmission line in step 808. The delay is measured from the charging event to the discharge event in step 810. In step 812, the terminations are enabled at both ends of the transmission line, if the system include end terminations.

In one implementation, the master sends out the device loop delay command, followed by the device number to be interrogated. Next, the master sends out a device ID value in the data field. If the device ID is equal to the data field, an internal flag ("device_update_ready") will be set, and if the device ID is not equal to the data field the internal flag will be reset. Next, the bus is brought to a known state by the master (i.e. the bus is initialized to a known logical value, zero). The master will maintain this state with weak bus holders or using a floating bus and disable its transmitter after driving the bus to a known state and ensure terminations at both ends are disabled during the measurement. As an example, the master may use a 0-1 signal for synchronization and leave the bus in the '1' state.

A slave device can then drive this state to a different value using the strong internal driver inside the slave device. In one embodiment, the slave devices output the following sequence where Z is a disabled driver, and 0 is driving a low signal—ZZZZ-00-ZZZZ—and the double zero will ensure a correct reading of zero under all delay conditions. When the master receiver receives the transition signal from one or more slaves, it will know the delay from the timing. The timing for this event will be used to find the two-way delay to the nearest device and to optimize the eye diagram of the receiver by controlling the transmit or receive timing delay. The delay value may be measured based on an internal oversampled clock inside the master device or use of a delay line or delayed sample inside the master device. In some cases, where is a significant amount of noise or clock jitter present on the bus, it may be necessary to repeat this procedure multiple times in order to get a good delay reading. This may also involve the reading of the returned value from multiple timeslots and obtained with a fine resolution, e.g. 2 ns, and then averaged over multiple read values, e.g. 64. If the returned value could happen in any position from 0-36 ns, we would need a total of 19 values each based on multiple measurements returned from a slave device to accurately determine the delay in all cases, and in each case, we might have to perform multiple (e.g. 64) readings to get a good average value returned. By starting the search from a middle delay position, it is possible to significantly reduce the search time. Furthermore, it is also possible to reduce the search time by changing search direction depending of what the last returned value was, since this gives an indication of whether the delay is too long or too short. In the limiting case, we would measure around 50% zeros and ones back from the slave exactly at the transition. In addition to this, we would need to add ½ data-slot to get the best sampling point.

In another implementation, the master may write back the value it has read from the slave and then let the slave device self-adjust the internal delays. This may be used to optimize slave-to-master communication, i.e. reduce the required bandwidth for the adjustment. Similarly, one slave device may write the value it has read from another slave device and let this other device self-adjust its internal transmit timing.

The charge left on the bus will be absorbed by the master when it sets the bus to a known value and thereby empty the transmission line of any previous information. If multiple slaves are present, they can be eliminated one at a time using their device ID (16 bits constant). The slave closest to the master will correspond to the obtained delay value. In other words, during measurement of device delays or enumeration of devices attached to the bus, the first device attached to the transmission line (typically the master) and the last device attached to the bus (typically a slave device) will both disable their driver during this procedure to enable a floating bus, that maintains the state by the intrinsic charge inside the transmission line.

In various embodiments, only devices with number DEV and a device ID equal to or higher than the data field value will activate the output. A binary search can then be used to find the device with the highest address current connected to the bus, eliminate this device from the search by assigning it a different device ID, typically 3 bits to save bandwidth and continue to find the address of the second highest device attached to the bus, and so on. In other words, an arbitration procedure will have to be used first, so that the MSB of the device ID is first read and all slaves with a low device ID will back off. This procedure will be continued until only a single device will respond (notice, this procedure is similar to I²C multi-master and SoundWire address arbitration).

In one embodiment, all devices will turn off normal data traffic in the last row of a frame when the delay command is used to ensure they will not disturb the measurement. In some embodiments, a slave device may be programmed to use a specific delay that corresponds to a certain geometrical configuration, thereby omitting the need for finding the physical delay before interacting with this component and omitting the need for inclusion of non-volatile memory or other means to convey the delay value to the internal circuitry.

Figure 10B:
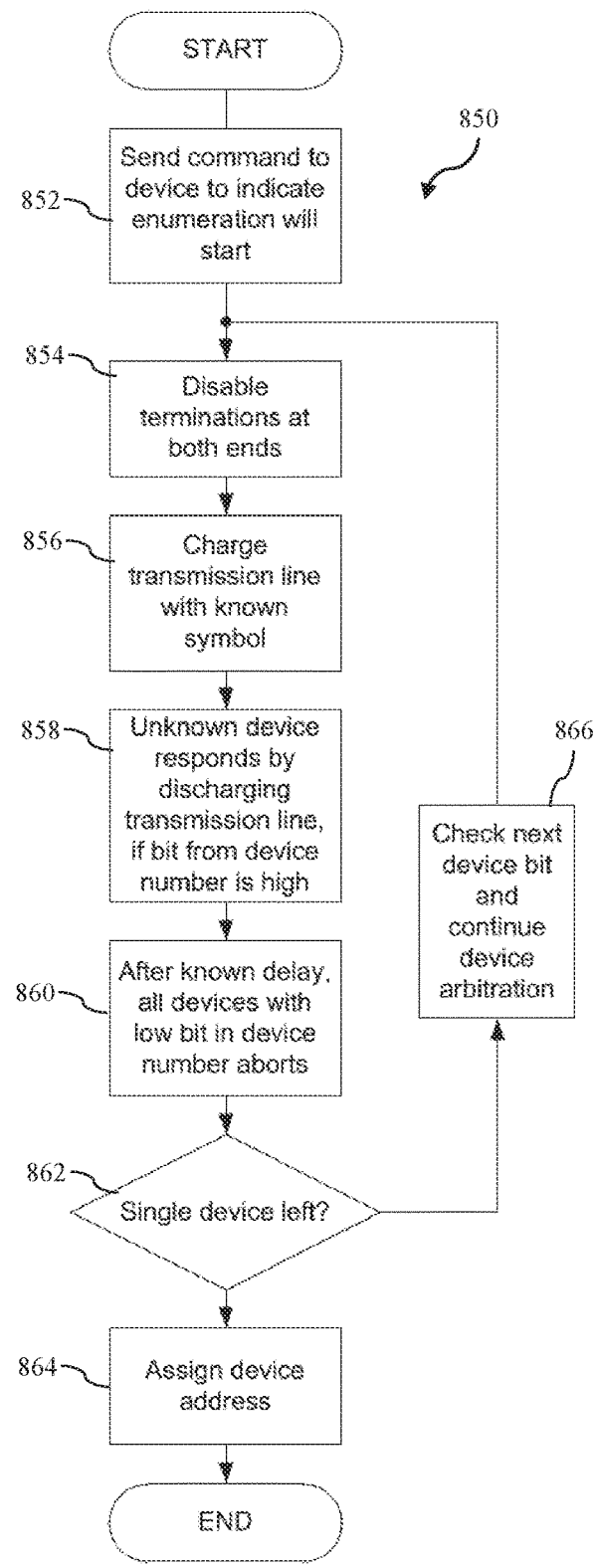
FIG. 10B illustrates a method for enumeration of attached devices in accordance with one or more embodiments.

Referring to FIG. 10B, a method 850 for enumeration of attached devices that contain an internal device number, but not a device number suited for the bus, is illustrated. In step 852, the master sends a command to indicate that enumeration will start. Terminations at both ends are disabled in step 854, and the master proceeds to charge the transmission line with a known symbol in step 856. An unknown device on the bus responds by discharging the transmission line if a bit from the device number is high (step 858). After a known delay, all devices with a low bit in the device number for this position will abort (step 860). If more than one device remains (step 862), then the next device bit is checked, and device arbitration continues in step 864. If only a single device remains, then the device is assigned an address in step 866. If the Master knows beforehand the long ID (e.g. 16 bits) of all attached devices, it can simple address these one at a time and reassign each device a new short ID (3 bits) immediately after boot without needing to perform address arbitration.

An embodiment of a "set device address" command will now be described. After power-on reset, slave devices are assigned the device address value zero. When executing this command, the addressed device will get a new address (0-7). Notice address 7 (111) is included for broadcast. In one embodiment, only a device with the device_update_ready set will be updated.

Duplex Operation

Figure 11A:
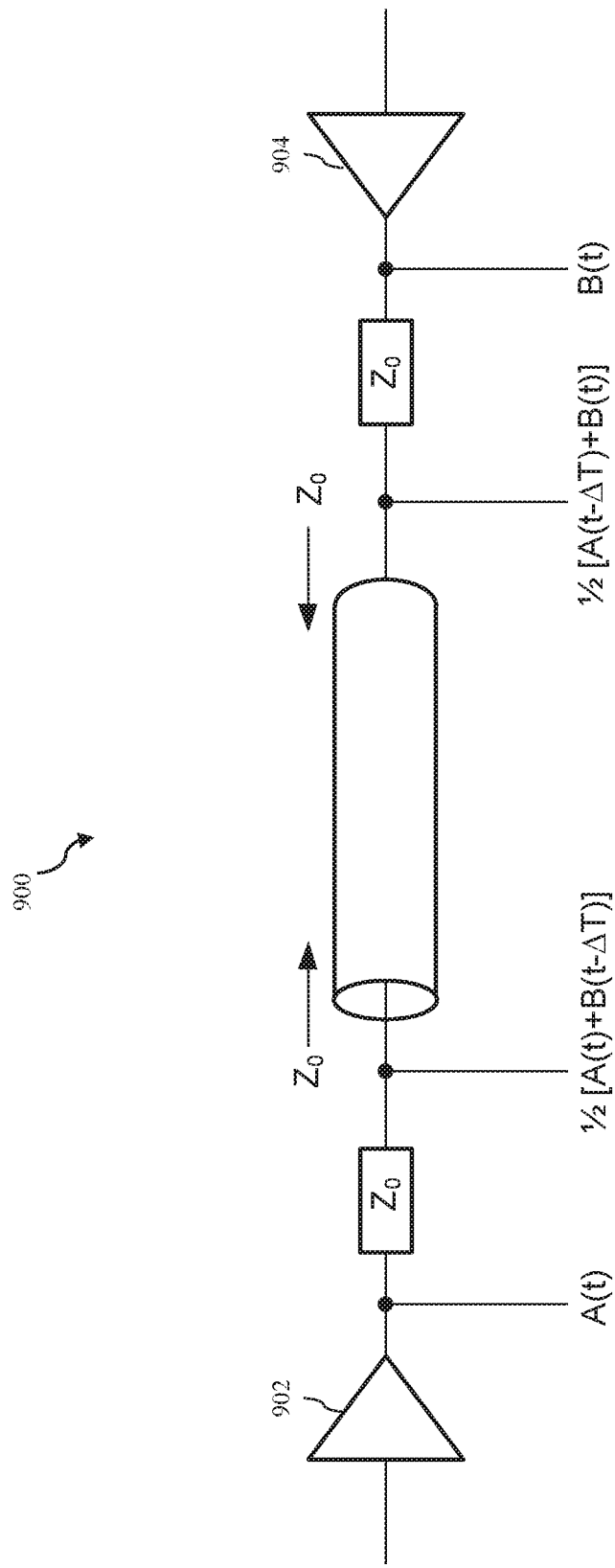
FIG. 11A illustrates an exemplary duplex communications arrangement in accordance with one or more embodiments.

An embodiment of duplex operation will now be described with reference to FIG. 11A. In various embodiments, the bus 900 may work in either simplex or duplex mode of operation. In this arrangement, the I/O ports may be configured to both transmit and receive signals simultaneously through design of the output driver, which may be used to enable a bus length exceeding 25 meters, such as may be used for home audio systems.

In this embodiment, the transient response at the forward and backward travelling waves is used to assess what is happening when two simultaneous drivers are present. The voltage at any point is determined by the sum of the forward and the backward travelling wave. Therefore, we can measure the point at any node and subtract the influence from the two drivers rather simply, by taking into account the impedance of the output driver and the impedance of the transmission line.

For simplicity, let us first assess the situation with only two drivers 902 and 904 located at each end of a transmission line. Let us also assume the drivers 902 and 904 use a series termination with a value equal to the transmission line impedance, $Z_0$, to properly terminate the link. This means both the forward and backward travelling waves will be half of the initial driver voltage. Since the voltage at any point can be found from the sum of the forward and backward travelling waves, we can find the correct received voltage by subtracting half of the driver voltage from the measured voltage. This can be done for the differential case, by simply adding half the inverted transmitted voltage to the received signal, e.g., by swapping and adding half the differential transmit voltages using a capacitor. In this approach, a two-way delay during turn-around of transmitter direction is not needed for many configurations and much longer links (e.g., 25 meters) are possible with continuous operation and no breaks in the data stream due to the absence of turn-around delays and full duplex operation at extremely high speeds are possible (0.1-5 Gbps). Notice, this configuration does not require any timing adjustments as long as the operation is confined to one node at each line end and the at least one node send out synchronization pulses on a regular basis.

Multiple Slaves

Various embodiments of multiple slaves will now be described. While duplex operation is relatively simple when having a single master and a single slave device, the situation becomes more complicated for multiple slave devices. One issue is that intermediary nodes will reflect waves from either direction, because they do not present a termination (in order to enable a multi-drop connection). Therefore, traditional duplex operation may not be practical for certain implementations. It is however, possible to increase throughput with proper timing of the signals. In various embodiments, signals will come from master to slave devices first. Other slave devices may need to wait until the forward wave from the master has passed these devices before they can begin to transmit. Therefore, an exemplary timing diagram to handle this situation and without needing any handover delays would be the following transmit sequence: {M, S1, S2, S3, S4, S5} and then repeat this pattern in reverse {S5, S4, S3, S2, S1, M} when changing direction, where M represents the Master and S1 is the slave device closest to the Master and S5 is the slave device furthest away from the Master. In other words, the devices attached to the bus shall either transmit a sequence for a forward or backward wave and that way avoid problems with reflections from intermediate points on the transmission line. The timing delays of devices attached to the bus shall be determined and corrected before attempting this scheme.

Figure 11B:
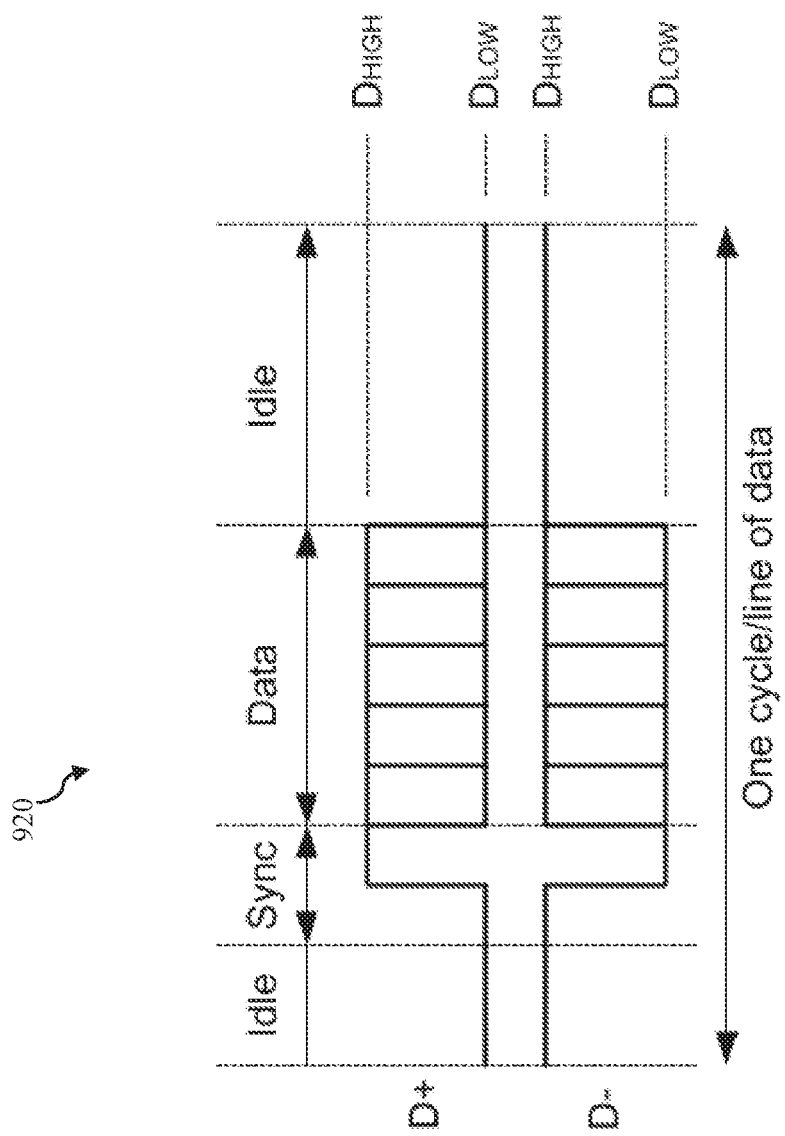
FIG. 11B illustrates an example of differential signaling, synchronization and digital data communication in accordance with one or more embodiments.

By ensuring a differential signaling scheme is used for all communications, the emitted and received EMI will be significantly reduced. FIG. 11B shows an example of differential signaling 920 starting with an idle period, following by a synchronization signal, then data and then going idle again. The idle period should also be of differential nature to avoid common mode noise, which means the terminations on one line should be ending in a high level and the other in a low level to avoid static power consumption during the idle period and thereby enable very low power consumption for modest bandwidth requirements.

Figure 11C:
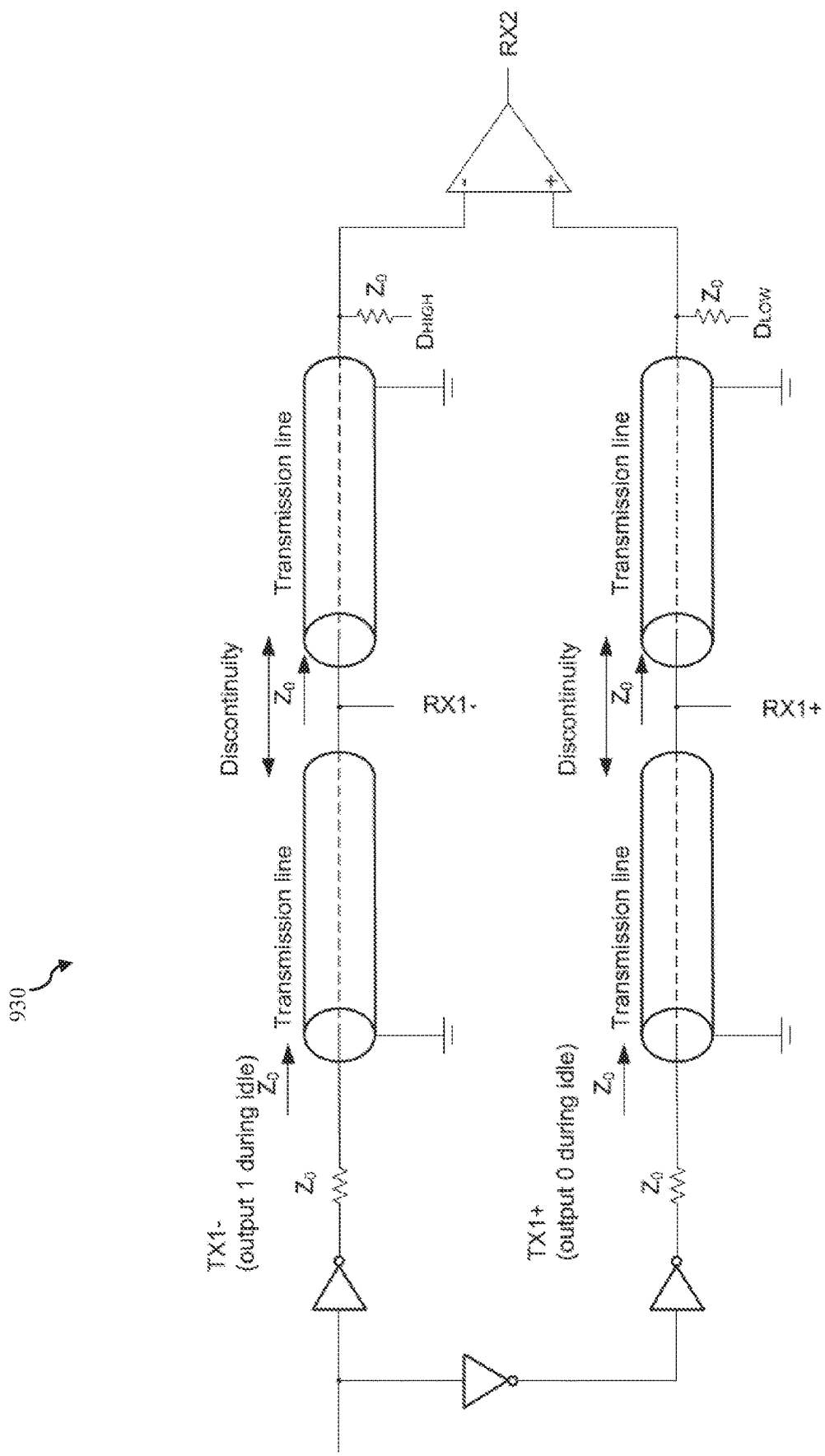
FIG. 11C illustrates an example of a differential signaling system in accordance with one or more embodiments.
Figure 11D:
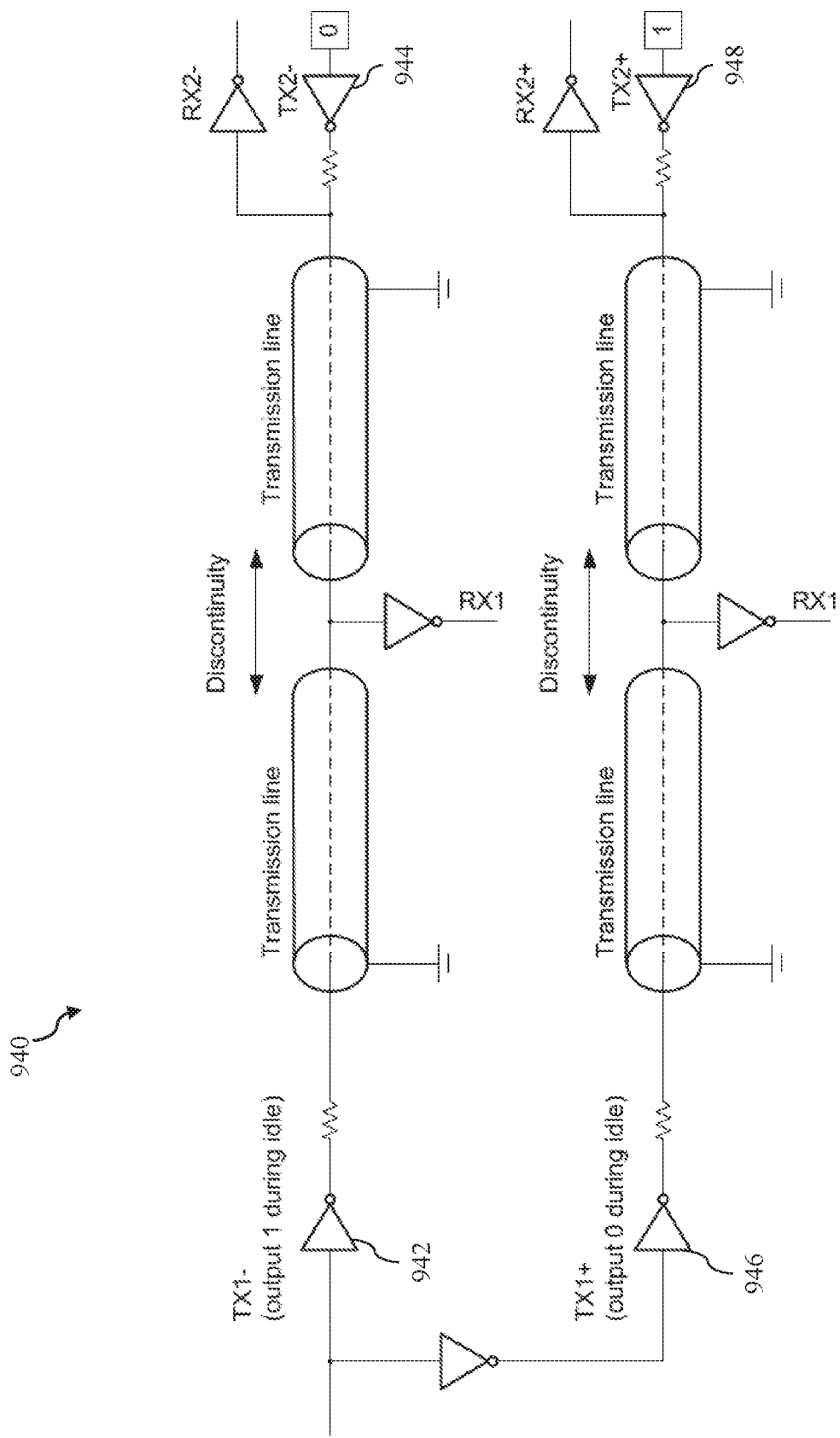
FIG. 11D illustrates another example of a differential signaling system in accordance with one or more embodiments.

FIG. 11C shows an example of a differential signaling system 930 with terminations to the high and low signaling voltage to ensure lowest possible EMI and lowest possible power consumption in idle mode. FIG. 11D shows a similar example of a differential signaling system 940, where the transmitters 942, 944, 946 and 948, at each end are used as serial terminations of the bus, thereby lowering the power consumption at the end nodes, due to the absence of termination loads and simplifying the implementations. When the bus drivers at each end are not signaling data, they will go to the idle state, signaling the default termination voltage, thereby lowering power consumption in idle state. In some embodiments, one of the two transmission lines may use a power line instead of ground for shielding, thereby enabling the transfer of power also. Some embodiments may use 4 twisted wires instead of shielded coax-cables, e.g., including DATA+, DATA−, ground and power in four-wire twisted pair configuration for low EMI requirements. The ground and power line will further reduce EMI. In other embodiments, a single shield will be used and power and differential data will be located in three wires inside the shield.

In some applications, it is important to minimize the audio noise induced by random signaling occurring on the bus. This may be done by changing signaling level of various sources on the bus, e.g. by using a pseudorandom generator at the transmitter and receiver of data ports thereby randomizing bus traffic and thereby lowering the spectral content in the audio band. In some cases, the randomization may be performed with spectral sharpening, so the spectral content in the audio band is even lower by multiplying the data signals with a high frequency content, e.g. by multiplying every row with a certain random or predefined value. In some cases, the randomization may be performed by simply multiplying the rows with a carrier outside the audible bandwidth. In some embodiments, each port includes an error tester (e.g., an 8-bit pseudo random generator for verification and testing). This port tester may also be used for the scrambling and de-scrambling of the audio data. The multiplication in the digital domain may be carried out by an XOR or XNOR gate. For example, an almost identical pseudorandom generator may be used for recovering the original sequence of data, see e.g. the SoundWire specification for examples of pseudorandom generators and receivers/testers. Similar techniques have been used earlier e.g. in radio modems in order to reduce or remove DC-content from a transmitted data stream. The use of scrambling here is not so much as to avoid a situation with the transmission of multiple symbols of the same value, that could lead to a loss of the synchronization, but is used for reducing the low frequency content of the output spectrum such as to avoid any interference in the audio band.

In some cases, the randomization may be performed using a delta-sigma modulator with a known pattern such as to not only randomize the output from various transmitters and thereby reduce any audio disturbance, but furthermore even noise-shape the output spectrum of the noise by deliberately controlling the noise transfer function of the modulator.

Cable Specifications

Exemplary cable specifications in accordance with various embodiments will now be described. For in-ear headsets a thin cable may be used to satisfy user requirements, such as a shielded configuration that uses thin AWG30 or AWG34 wire. For longer links or for large headsets and headphones, it may be possible to use thicker cable, which also lowers the attenuation a bit, an example would be a double twisted pair of cables similar to CAT5 requirements (wire type AWG24), except only 4, not 8 wires are needed. For example, standard 100BASE-TX cabling can be used. The attenuation for a link of 15 meters would be 66 db/100 m×15 m=9.9 dB or 3.1 times. Thus, the difference between the transmit voltage and the maximum receiver hysteresis should take this into account when designing a system.

Intermediate Nodes

Exemplary embodiments with intermediate nodes will now be described. In various embodiments, end nodes have a series output impedance of $Z_0$ in order to be matched to the transmission line, while intermediate nodes will look into an impedance of ½ $Z_0$ (because intermediate nodes will essentially look into two transmission line each with impedance $Z_0$). It is often desirable to provide the same performance for all nodes. In various embodiments, (i) each node has an output voltage of U0; and (ii) each end node has an output impedance of $Z_0$. The impedance of intermediate nodes will result in reflected waves if they are active while a travelling wave reaches the node. This situation can be avoided by proper timing of the signals, i.e. each node first transmits signals after the signal waves with previous transmitted information have passed. The travelling waves will ultimately be absorbed at the transmission line ends. Exemplary transmission line impedance and signaling voltages may include $Z_0$=75Ω, $U_0$=250 mV, with differential signaling being used.

Additionally, intermediate nodes on the transmission line will face two line inputs, and if their output impedance is the same as the nodes located at the far ends of the transmission line, the output signaling voltages will be lower. This can be corrected either by using lower output impedances for intermediate nodes, by increasing the output driving voltages of intermediate nodes or by adjusting receivers on the transmission line to a lower threshold voltage.

Startup Sequence

An exemplary startup sequence will now be described. In various embodiments, the normal signaling is differential, two-level signaling. However, to obtain a unique pattern for start-up condition and for resynchronization after possible slave failure or after a power-down condition, the master may be configured to send out a third or different higher voltage level. This level will not be used for data transmission but only for resynchronization of slave devices or start up condition (waking up from low power standby). This will not impact the emitted EMI, because this higher level is only used during initial synchronization (e.g., first 1 ms). In one embodiment, the start-up sequence consists of 12 bit slots with a voltage level of double of the normal signaling level. In various embodiments, immediately after the start-up sequence will follow the synchronization edge used by the PLL. The start-up sequence will not be transmitted during normal operation to lower EMI and to increase available bandwidth. In the illustrated embodiment, during startup or resynchronization, the master will have approximately 62.5% left of the original bandwidth (using 12.288 MHz clock frequency) and 40% left of normal bandwidth in 9.60 MHz operation mode. In a simplified implementation, a DC-offset is added to a certain number of time-slots, e.g. 12 and because the receivers are differential, the extra offset will not affect the data but can be used to detect a power-up condition. In an even simpler implementation for initial and start-up conditions only, a logic voltage such a 1.0V may be used for wakeup detection, thereby eliminating the need for a differential receiver in the low power state.

Exemplary differential signaling voltages are illustrated in the table, below.

| Parameter | Min | Max | Unit |
| --- | --- | --- | --- |
| Signaling voltage high | 250 | 350 | mV |
| Signaling voltage low | −75 | 75 | mV |
| Receive low | −300 | 100 | mV |
| Receive high | 200 | 1200 | mV |

In various embodiments, to ensure a safe startup mechanism for a slave device, a higher voltage level is used on the bus line when a slave device needs to get back in sync again. This higher voltage will be used to distinguish between normal data traffic and reset conditions. It may also be used for power-up circuits for low power wake-up (e.g. wake up word) while the bus is running. The higher bus voltage may be on for a longer time than a normal data symbol to avoid random noise on the bus to trigger the wakeup circuit and to lower power consumption. To get reasonable tolerances, good noise immunity and low power consumption, it is suggested the wake-up event will consist of a trail of 12-bit slots. This is equivalent to a minimum on-time of about 89 ns at a highest bit clock of 134.400 MHz.

Figure 12:
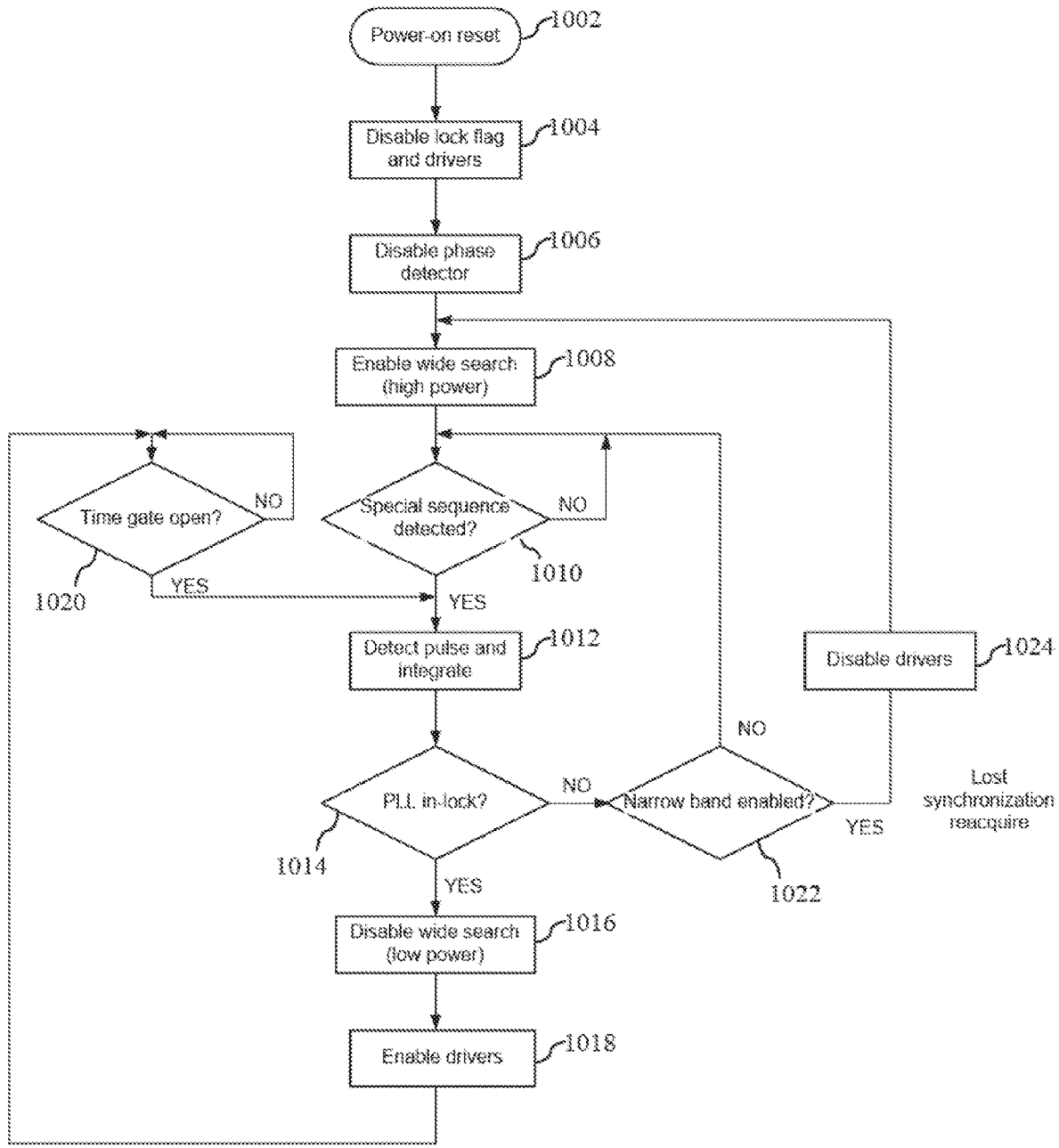
FIG. 12 illustrates an exemplary PLL lock sequence in accordance with one or more embodiments.

Referring to FIG. 12, the system is powered on in step 1002, and the lock flag and driver are disabled (step 1004) and the phase detector is disabled (step 1006). In step 1008, a wide search is enabled to detect devices. If a special sequence is detected for a device in step 1010, then the sync pulse is detected in step 1012. If a special sequence is not detected for a device, then the step is repeated until it is detected. In step 1014, if the PLL is in-lock, then the wide search is disabled (step 1016), and drivers are enabled (step 1018). The sync sequence (steps 1012-1018) repeat when the time gate is open (step 1020). If the PLL is not in-lock (step 1014) and narrow band is enabled (step 1022), then the drivers are disabled in step 1024 and control passes to step 1008 to repeat the wide search at high power.

Figure 13:
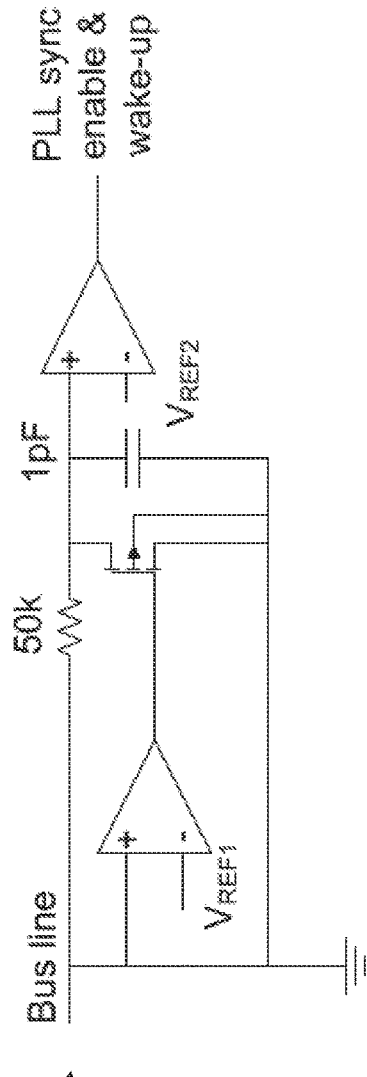
FIG. 13 is an exemplary PLL sync enable circuit in accordance with one or more embodiments.

The operation of a special start-up circuit 1100 will now be described with reference to FIG. 13. During normal operation, there will be no start-up sequence and the output from this circuit will be zero. The output from this circuit is used until the PLL gets in lock. In operation, the circuit will filter the input from the bus and if the bus has been above a certain high threshold for a certain time, enable the PLL to look at the next high-to-low transition. When the bus level is at low, the circuit will discharge any accumulated charge and start over again looking for an uninterrupted sequence of a high value.

| Parameter | Min | Max | Unit |
| --- | --- | --- | --- |
| VREF1 | 250 | 350 | mV |
| VREF2 | 500 | 600 | mV |
| Low to reset | 0 | 8 | ns |
| High to enable PLL | 50 | 100 | ns |

The length of this series of logical ones will depend on the clock frequency and the length of the high value synchronization pulse. This may be used by an analog circuit to check for the start of sync under error conditions.

The output from the phase detector is enabled after 50 ns (at most 120 ns) or logical ones followed by a logical zero. This enables audio transfer even during faults using at most 4 consecutive time slots in the illustrated embodiment. During fault conditions, the first 4 columns are reserved for audio transfers, while every $5^{th}$ columns is used to send a logical zero, followed by more audio until the start of the sync pulse. After the 0-1 transition, the phase detector output is disabled again. In one embodiment, after a slave device has obtained lock, it looks inside a narrow window determined by the current lock position for the sync transition and ignores all other bus traffic.

Lock-On Detector

| Parameter | Min [ns] | Max [ns] |
| --- | --- | --- |
| Enable | 50 | 120 |
| Reset time | 0 | 8 |

Exemplary signaling solutions will now be described. In a first signaling sequence solution:

Three-level signaling is used: {−1, 0, +1} as signaled by {low, zero, high} for reduced EMI, similar to CATS signaling.

Logical zero: Same level as before (four zeros may be followed by a value from the reverse sequence, i.e. going in opposite direction after several zeros to ensure safe start detection).

Logical one: The next value in sequence of trinary values, e.g., multiple ones will be signaled as the sequence {zero, high, zero, low, zero, high, low etc.}. The sync value will then use a different sequence e.g. {high, low, high, low} or {zero, high, zero, high} than possible by legal data values to distinguish between sync and data. In other words, trinary encoding enables a receiver to reliably distinguish between sync and data while enabling a reduction of the EMI by lowering the harmonics generated.

In a second signaling sequence solution, two-level signaling is used. In one embodiment, no device except the master can own more than 4 time-slots in a row, or a zero will be inserted between packets. If multiple devices sent data out after each other, spacing is used between for every 4 bits and a zero inserted. If an analog delay circuit can be made with more narrow tolerances than stated above, more bits can be transported in sequence. This is an example where bandwidth is traded off to enable a special encoding of sync symbols that is different from any legal data value. Other encoding schemes such as 8/10B encoding could be used to distinguish between sync and data.

Figure 14:
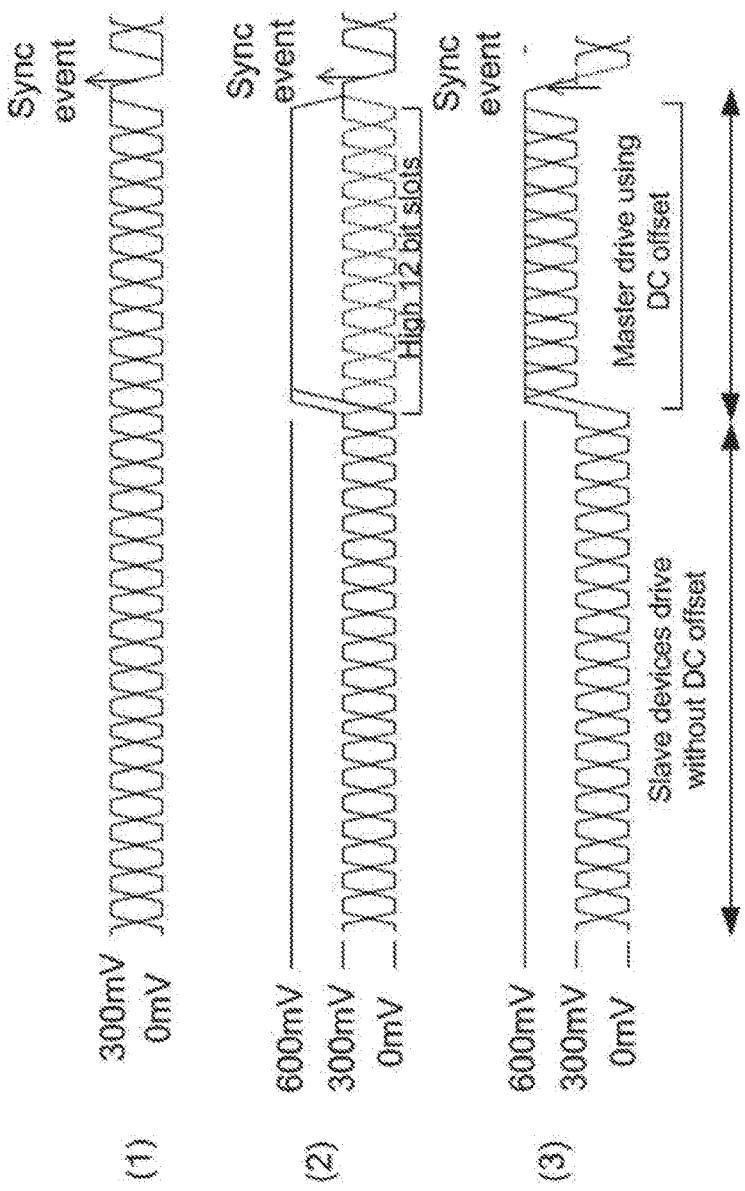
FIG. 14 illustrates exemplary synchronization signaling in accordance with one or more embodiments.

In a third signaling sequence solution, a DC-offset is applied to all signaling from the master, while slaves will use no DC-offset. The differential signal mat be modulated by the Master with a common mode signal to indicate the start of a frame. While this will increase the EMI somewhat, this will only happen for a short period during initial synchronization. This change in DC-offset can be reliably be detected by slaves and thereby sync can always be obtained, regardless of the current signaling pattern on the bus and any previous encountered state inside any slave device. FIG. 14 (3) illustrates an example of this solution.

High Speed Transition

Figure 15:
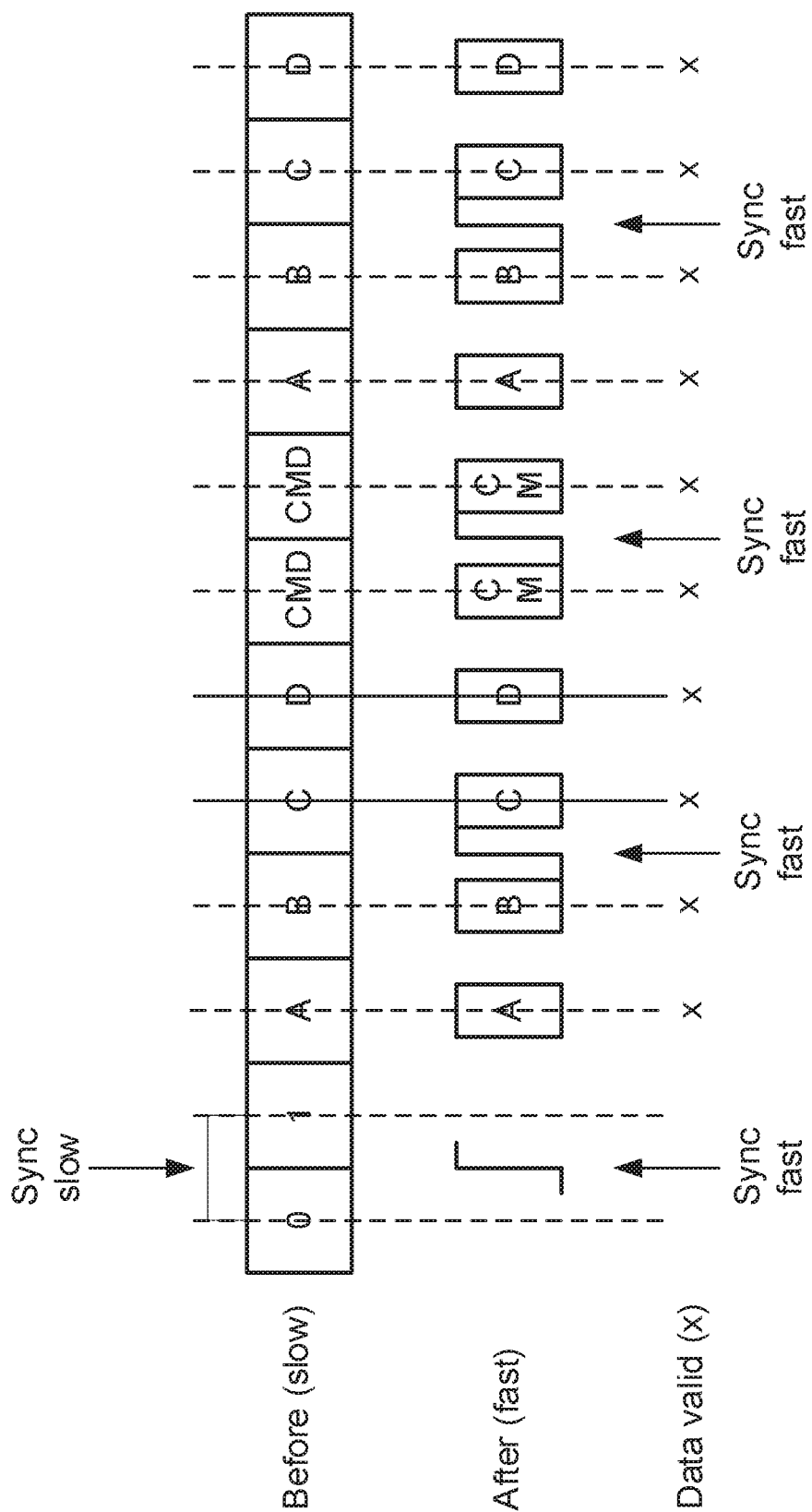
FIG. 15 illustrates an exemplary operation of a digital data communications system in accordance with one or more embodiments.

Referring to FIG. 15, an embodiment of an operation of the present disclosure will be described. This solution allows the synchronization rate to be changed even while audio is still running. In one embodiment, 250 mV signaling may be used for both a slow and a fast mode, and the sync edge of the received signal inside the gated time window is used for audio sampling. In a slow speed mode, there is no extra power consumption on the bus if the time slot is not driven and there is little extra power consumption from the internal PLL running at a higher rate. Therefore, a higher frequency for the slow mode may be selected which is used as a low power mode. In slow speed mode, devices can check sync relatively easily (e.g., 2 slots out of 12 used for sync). In one embodiment, all devices are maintained in sync at all times. In another embodiment, devices may enter a sleep mode and wait for a special VDD wakeup signal, which will induce a delay (e.g., 1 ms) before they are functional.

In one or more embodiments, a transition to high speed starts in slow mode with slow sync (e.g., 768 kHz). Extra sync symbols are inserted to prepare for high speed mode and time slots are made shorter but the original 768 kHz transitions are maintained. Symbols are assumed to be read in the middle of the transmit interval. The extra sync symbols are not seen by slow mode devices. Each transmitter includes an internal clock running at least twice the original time slot clock to insert the shorter symbols. In high speed mode, there are now more time slots. In various embodiments, a slow device may read in a fast mode. This solution enables a change in bandwidth and sync repetition rate while keeping audio running and having both slow and fast devices attached to the bus at the same time. It basically inserts sub-intervals in the existing timing and uses these sub-intervals to add bandwidth to the existing transfer protocol. This approach may be used for backwards compatibility with existing interfaces such as SoundWire and also enable the support of a higher bandwidth the original interface could not provide.

Frame Synchronization and Bulk Transfers

A person having ordinary skill in the art will recognize many advantages of the systems and methods disclosed herein. In various embodiments, multiple upstream facing interface devices (slave devices) may be attached to a bus at various points, and may communicate with each other at full speed, in part, due to accurate timing measurement. The signaling from different devices may be stacked close together due to timing control and differentiation between forward and backward waves propagated through the transmission line. This enables a high bandwidth even with moderate slew rates that reduce EMI, which is beneficial for certification and the adherence to EMI standards such as FCC class A and B devices, part 15.

The systems described herein may be used to facilitate low power data communications over two wires. The interface supports multi-drop operation with one master and one or more slave devices and allows for point to point communications between slave devices at full speed and across longer distances than conventional time-multiplexed low latency systems. Lower electromagnetic interference (EMI) is achieved through differential low voltage operation and control of slew rates. Each slave device includes a PLL/DLL and the system supports terminated multi-drop, multiple device system arrangements.

The systems and methods include a simple frame structure and initial synchronization sequences that provides many advantages over conventional approaches. In various embodiments, the initial synchronization between Slave and Master devices is simple, robust and uses a constant frame size. While a varying frame size has been used in prior systems to ensure compatibility with multiple clock systems, a different approach is taken in the present disclosure. The present disclosure exploits extra degrees of freedom provided by an oversampled clock system as disclosed herein, to provide a flexible and effective solution. In some embodiments, the actual clock frequency may be inferred from beacons signals that forms part of a frame.

Figures 16A, 16B, 16C:
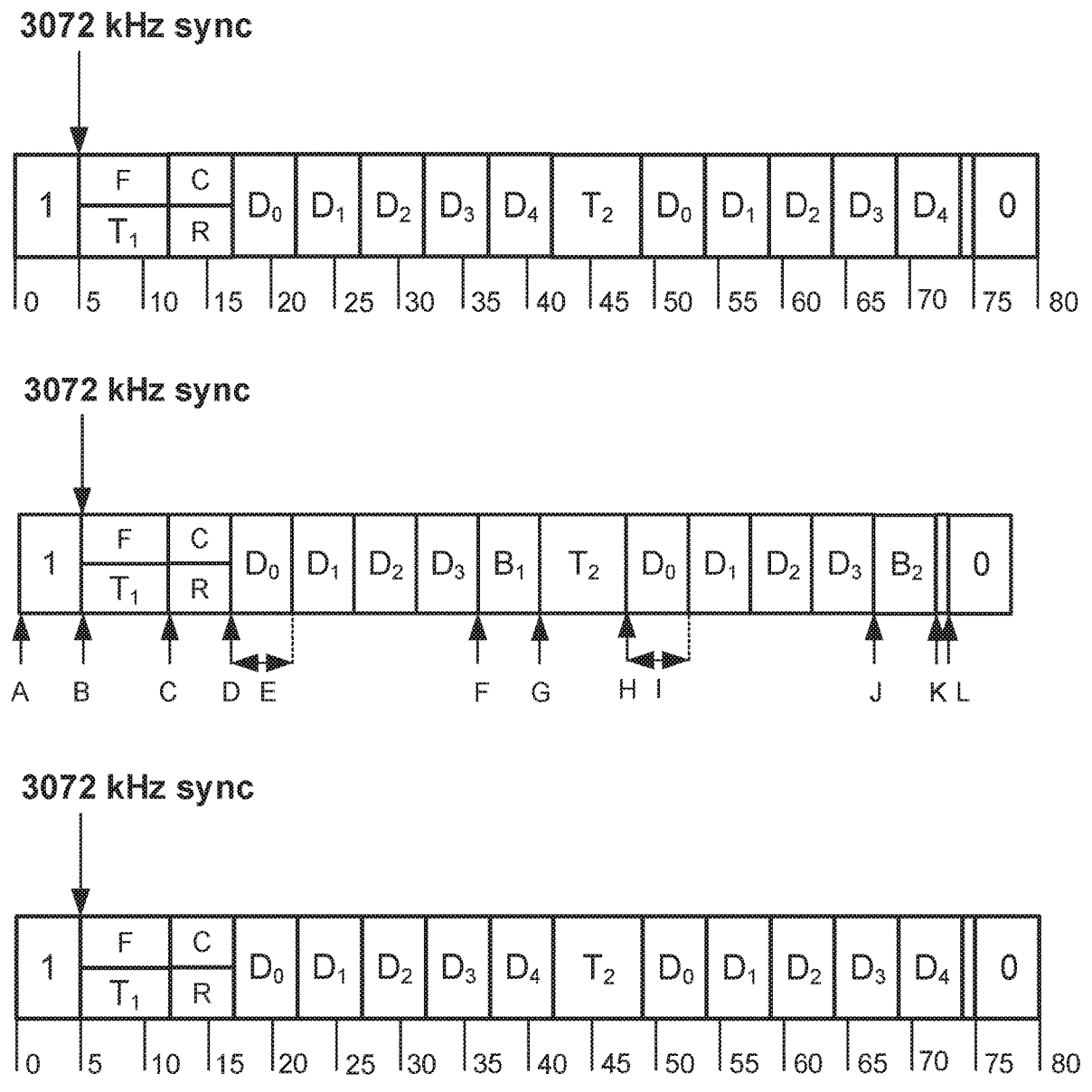

In some embodiments, a line of data comprises 80 timeslots regardless of the clock frequency and mode of operation. The interpretation of these timeslots may depend on the configuration chosen, though the individual fields will be located in the same sequence. At boot up, the default data format is set for the longest bus diameter (slowest speed). Referring to FIG. 16A, the different fields in each line of data are illustrated. By changing the interpretation of the individual timeslots, it is possible to select various compromises between baud rate and bus diameter. The synchronization pattern repeats with a frequency of one per line of data (e.g., the synchronization rate is 3.072 MHz as shown in the figure). Each line starts with a zero to one transition. This transition is used as a sample event for internal delta-sigma converters and for locking a PLL/DLL on to the bus, so that bits can be received. FIG. 16A illustrates the synchronization pattern and a simplified line description. One advantage of using the zero-to-one event as the sampling event for delta-sigma converters is, that it only contains jitter from the master clock and not the extra jitter associated with the clock recovery of the slave device. Therefore, this solution enables low jitter for audio sampling even there is higher jitter inside the clock recovery unit in the slave device due to the requirement of a low current consumption of the PLL/DLL.

Each line consists of a synchronization field (the frame starts with a logical one and ends with a logical zero), a command field (C is command from Master), a field for transport of audio in the forward direction (typically from Master to Slave), a two-way delay "turn-around" to enable changing of signaling direction ($T_1$), a response field from a Slave device 'R' (only used when reading from a Slave Device), a field for transport of audio in the backward direction (typically from Slave to Master) and possible void field and finishing off with the start of the synchronization pattern. The line may further include a forward command (from master to slave) and framing (beacon) field (F) and data fields $D_0$-$D_4$. The number of time slots allocated to each of these fields may vary with the application, but the total number of time slots within a line is a fixed number, e.g., 80. In order to change the number of columns in a line, the technique of FIG. 15 can be used (e.g., to change from a sync rate of 768 to 3072 kHz). FIG. 16 represents a default configuration at start-up, where the index shown below is the number of the timeslot at the start of each field.

The transport of data will happen on a transmission line. To avoid collision between data packets from multiple devices, we will distinguish between a forward wave and a backward wave. The forward wave starts at the Master and is directed away from the Master. The backward or reverse wave is data that has been sent out from a Slave device and is travelling in the direction towards the master. During the turn-around period no device will transfer any information and their drivers are disabled (apart from the possibility of active terminations for such systems).

Audio data can travel in both directions on the link, i e in the forward direction from the Master Device to Slaves Devices and in the backward direction from Slaves Devices to the Master Device. If a Slave Device wants to transfer data to another Slave Device, that is located further away from the Master than the Slave Device itself, it will send data in the forward direction, i.e. in the fields labelled $D_0$-$D_7$, as shown in FIG. 16B. In various embodiments, the system may accommodate control data (register read and write), isochronous audio (PDM and PCM), asynchronous audio (PCM), and bulk transfer operation.

The table, below, lists registers that allow fine tuning of the interface to fit various bandwidth requirements versus signal integrity decisions. In some embodiments, the interface will start up with the default values after reset has been applied. In this embodiment, the TX delay is stored as a two's complement signed value to ensure compatibility with multi-drop configurations, and the RX delay is stored as a two's complement signed value. There could be a negative offset due to lag in the PLL/DLL. If the value of register F is equal to the value of register G, no block data will be transferred. If the value of register J is equal to the value of register K, no block data will be transferred. In the present embodiment, all register values are counted in half-clock increments, and except for the TX and RX delay registers, all register values are positive (single byte).

Referring to the table, below, the TX delay is stored as a two's complement signed value to ensure compatibility with multi-drop configurations. The RX delay is stored as a two's complement signed value, and there could be negative offset due to lag in the PLL. If the value of register F is equal to the value of register G, no block data will be transferred. If the value of register J is equal to the value of register K, no block data will be transferred. All register values are counted in half-clock increments. Except for TX and RX delay registers all register values are positive (single byte).

| Register | Event | Address | Master default value (decimal) | Slave default value (decimal) |
|---|---|---|---|---|
| TX delay | | | 0 | 0 |
| RX delay | | | 0 | 0 |
| PLL multiplier (read only) | | | 80 | 80 |
| One marker start | A | 0x10 | 0 | 0 |
| Frame sync/turn-around 1 start | B | 0x11 | 12 | 12 |
| Command/reply start | C | 0x12 | 24 | 24 |
| Forward data start | D | 0x13 | 36 | 36 |
| Forward data bit width | E | 0x14 | 12 | 12 |
| Start of bulk data from master | F | 0x15 | 84 | 84 |
| Turn-around 2 start (no block data) | G | 0x16 | 84 | 84 |
| Backward wave start | H | 0x17 | 96 | 96 |
| Backward data bit width | I | 0x18 | 12 | 12 |
| Start of bulk data from slave | J | 0x19 | 144 | 144 |
| Start of void (no block data) | K | 0x20 | 144 | 144 |
| Zero marker start | L | 0x21 | 148 | 148 |

Figure 17:
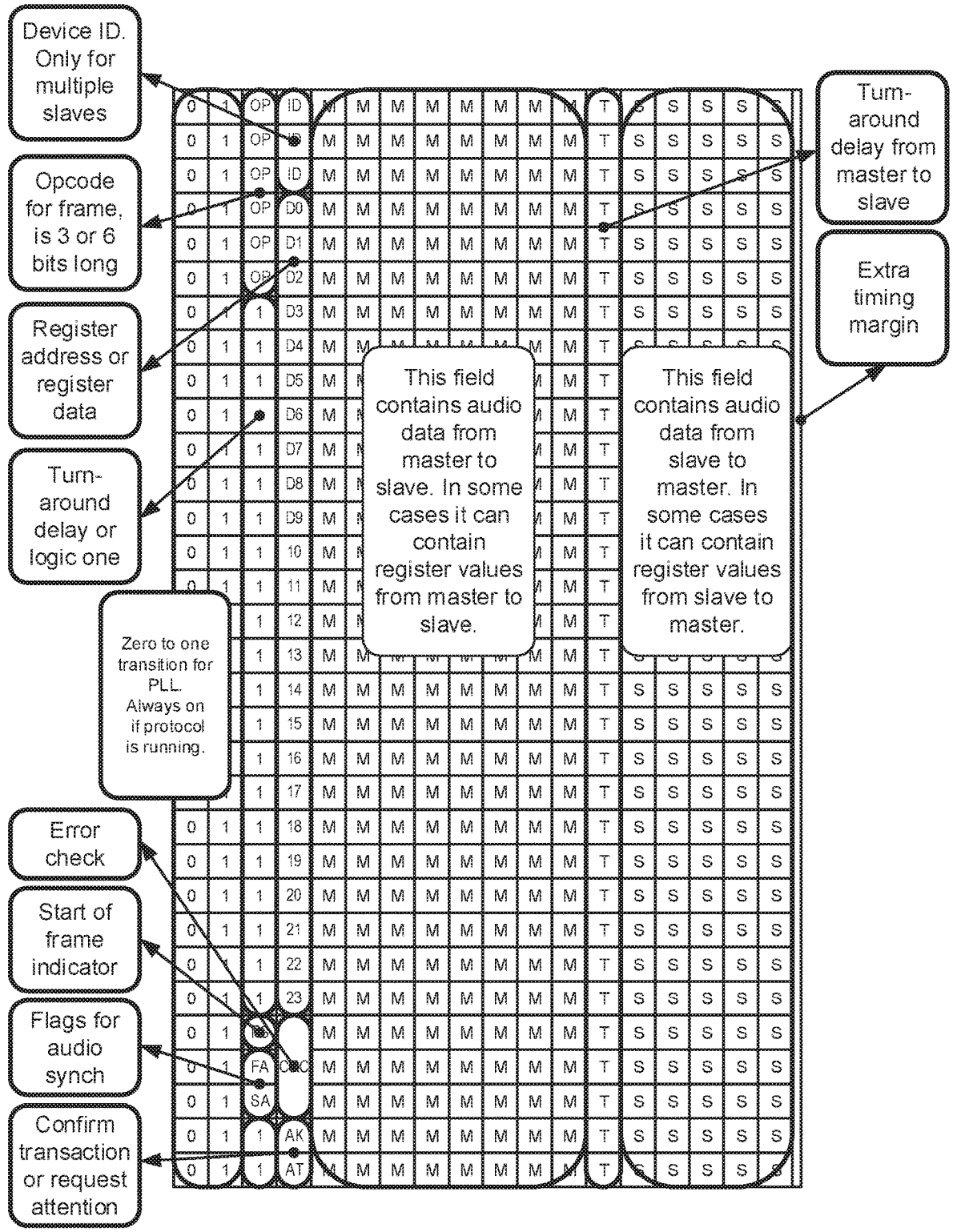
FIG. 17 illustrates an example frame in accordance with one or more embodiments.

A summary of a frame is illustrated in FIG. 17. The boxes in the first column and last column are sync driven by the master at a rate of 3.072 MHz. Certain boxes in the next two rows (e.g., OP, ID, ##, C, FA, SA) represent the command field driven by the master. The boxes labeled M represent audio data from master to slave and the boxes labeled S may include audio data or responses from slave to master. The boxes in the second column labeled 1 may include turn around delay or logic one and the boxes labeled T are turn-around delay from master to slave. In the illustrated embodiment, one column is allocated for multi-drop, multi-write applications (arbitration/enumeration). Most columns are dedicated to a single device but can be shared with careful timing control as described herein.

To save bandwidth, register read and write operations are performed by first updating an address register inside a slave device after which the actual read or write operation happens. This way, repeated read and write operations will not need to transfer the address in every command.

Commands are encoded using redundancy so that at least two errors are required to generate a different operation than intended, but usually more errors are required before this condition even happens. The operations have been designed with a conservative operation in mind—any single error will result in no operation, rather than trying to go ahead with a possible wrong operation. The commands are built over the following symbols {A, B, C, D}. The symbols are defined as follows:

A={D2, D1, D0}={1, 0, 0}
B={D2, D1, D0}={0, 1, 0}
C={D2, D1, D0}={0, 0, 1}
D={D2, D1, D0}={1, 1, 1}

These commands have a Hamming distance of two between them, i.e. it requires two errors to map one correct symbol to another correct symbol. The following values are considered faults or illegal symbols:

F1={D2, D1, D0}={0, 1, 1}
F2={D2, D1, D0}={1, 0, 1}
F3={D2, D1, D0}={1, 1, 0}
F4={D2, D1, D0}={0, 0, 0}

If any of the illegal symbols are encountered in a command, this command may be ignored and the intended receiver can respond with Request Attention at the end of this frame. Any ongoing block operation should be suspended, and only non-block operation will continue.

Commands are defined by an OPCODE field. This field can consist of either 3 or 6 bits. Only the read of 24 bits from memory will use the shortened form of the OPCODE. In other words, when the specific OPCODE for 'Read 24 bits' is encountered, this frame should immediately be recognized as a read frame even before reading all 6 OPCODE bits.

Block operations are suited for massive transfer of data to and from registers. These transfers have been protected to avoid them to interfere with any audio transfers by dedicating special fields within a line for these types of transfers. Thus, audio transfers cannot interfere with block transfers and vice-versa. This is handled by the lowest hardware layers. This ensures that simple programming errors will not crash the bus. It is possible to reduce the time slots allocated for block operations to zero. This will ensure block operations will not take place, even if several errors should occur in a frame.

In one embodiment, all block operations start with the symbol A, followed by one of these values for the second symbol: (i) "A" (Stop block operation)—this block will be the second last block of a series of block operation, and next frame will be the last frame containing block data, i.e. block transfers will stop one frame delayed; (ii) "B" (Define start address for a continuous write operation)—data will be stored in memory, starting with the defined start address and each next data word will store the contents in the next memory cell, and the third frame from current frame will use block transfers, i.e. block transfers will start two frames delayed; (iii) "C" (Define start address for a continuous read operation)—data will be stored in memory, starting with the defined start address and each next data word will store the contents in the next memory cell, and the third frame from the current frame will use block transfers, i.e. block transfers will start two frames delayed.

In an alternative embodiment, instead of using a "stop block operation" the number of elements to be copied during the bulk transfer will be defined first along with the start address. After the bulk operation has started, the addressed devices will carry out all operations by themselves and at the end of the bulk transfer, an IRQ ("Request Attention") will be generated to let the master know, the transfer has been completed. The master may then be able to access the status of the slave device to see if the bulk transfer was successful and check that the CRC value was correct.

Single read and write operations work by first defining the starting address of the register operation after which any later operation will perform the I/O operation using the previous defined address value. The definition of an address for subsequent register operations is defined by signaling the symbol D followed by the symbol B.

Read and write operations with address increment work by first defining the starting address of register operations after which any later operation will perform the I/O operation using the previous defined address value. When using this operation subsequent read or write operation will post-increment the address value inside the device after each read or write operation has been completed. The definition of an address for subsequent register operations with address increments is defined by signaling the symbol D followed by the symbol C.

A single write operation is performed by signaling the symbol D followed by the symbol A. The address used will have to be defined before using this operation.

When performing a single read operation, due to the intricate timing details of the bus, the reading operation will block all the bits of the second symbol. Therefore, the read operation is defined entirely by the first symbol, while the second symbol is ignored (Master will not drive the bus in this case). Furthermore, the read operation should start immediately after the first symbol (first three rows in a frame) has been read and interpreted. The read operation is defined by symbol C.

If the device ID number is 7, this will perform a status read operation, where all devices attached to the bus (except the Master) will return their status. The three bits returned from each device are as follows (MSB returned first, LSB last):

| D2 | D1 | D0 | Device status |
|----|----|----|---------------|
| 1 | 1 | 1 | Not attached to bus or PLL/DLL not locked |
| 1 | 1 | 0 | Device present |
| 1 | 0 | 1 | Device not ready |
| 1 | 0 | 0 | Device 3-bit CRC error |
| 0 | 1 | 1 | Device 8-bit CRC error |
| 0 | 1 | 0 | Device 24-bit CRC error |
| 0 | 0 | 1 | IRQ 1 (e.g., bus collision) |
| 0 | 0 | 0 | IRQ 2 |

If the device ID number is 7, this will perform a status read operation, where all devices attached to the bus (except the Master) will return their status. The three bits returned from each device are as follows (MSB returned first, LSB last):

The devices 0-6 may respond in a corresponding A-G field with relevant device status data (attached to bus, IRQ level). Due to the previous value of one on the bus, any change will have to be signaled using negative logic (active events are zero). Only the last 21 bits out of possible 24 are used for this operation. Devices may use dynamic address allocation to get this 3-bit address or a fixed device address, e.g., pin programming. Devices may use address zero as the initial value, if using dynamic address allocation. If the Master sets the ID to zero during a read, it will signify the reading of the 24 bits CRC value from the last accessed bulk transfer port. This means that if a device status is being read the first opcode will be 'C' and the second opcode is not driven.

Various status flags are provided to return status from all devices attached to the bus, including an acknowledgement flag and an attention flag. The acknowledgement flag confirms a successful transaction (e.g., read or write confirmed by a three-bit CRC value). To avoid a possible bus conflict, where multiple devices try to drive the bus with different values, this has been defined as an active logic low signal. If a device requests attention, it should drive this time slot low, otherwise it should not drive any value during this time slot. Since this is a shared bit, all devices can respond to this time slot. The attention flag (e.g., AT) signals a request for attention from any device attached to the bus. To avoid a possible bus conflict, where multiple devices try to drive the bus with different values, this has been defined as an active logic low signal. If a device requests attention, it should drive this time slot low, otherwise it should not drive any value during this time slot.

To avoid a single error to result in a block transfer operation, the block transfer will be fully defined in the previous frame. By changing the number of command bits per row, it is possible to transfer large amounts of data very quickly to and from registers, e.g. for DSP program upload. The block transfers will only happen if columns are allocated for this operation, this happens by writing to a register that defines the start of block transfers. If the block transfer register is equal or larger than to the turn-around register following it in timing, no block data will be transferred, not even if a block transfer command is issued. This ensures that block data will not overwrite audio data by accident. An example command table with the encoding of commands is set forth below:

| First Symbol | Second Symbol | Action |
|---|---|---|
| A | A | Initiate a block transfer operation. This frame defines the active block transfer ports. The block transfers will start in two frames. |
| A | B | Abort block operation. This frame will be the last of a block transfer. |
| A | C | Reserved |
| A | D | Read timing information. Method for delay adjustment of a Slave device using multiple delay measurements and feedback to the Slave. |
| B | A, B, C, D | Reserved |
| C | A, B, C, D | Ignore the second symbol and reply with read data from the device. When reading from device address 0, it will return the CRC status from last bulk transfer (TX port). When reading from device address 7, it will return the status of devices 0-6. |
| D | A | Write 32 bits register data to a slave device. The address for this write operation has been defined in an earlier operation. |
| D | B | Define the starting address in this device for read or write operations. The next read or write operation will use this address value. |
| D | C | Set up the address register inside the slave device for read. The next read or write operation will increment the address register after every access. |
| D | D | Reserved |

Figure 18A:
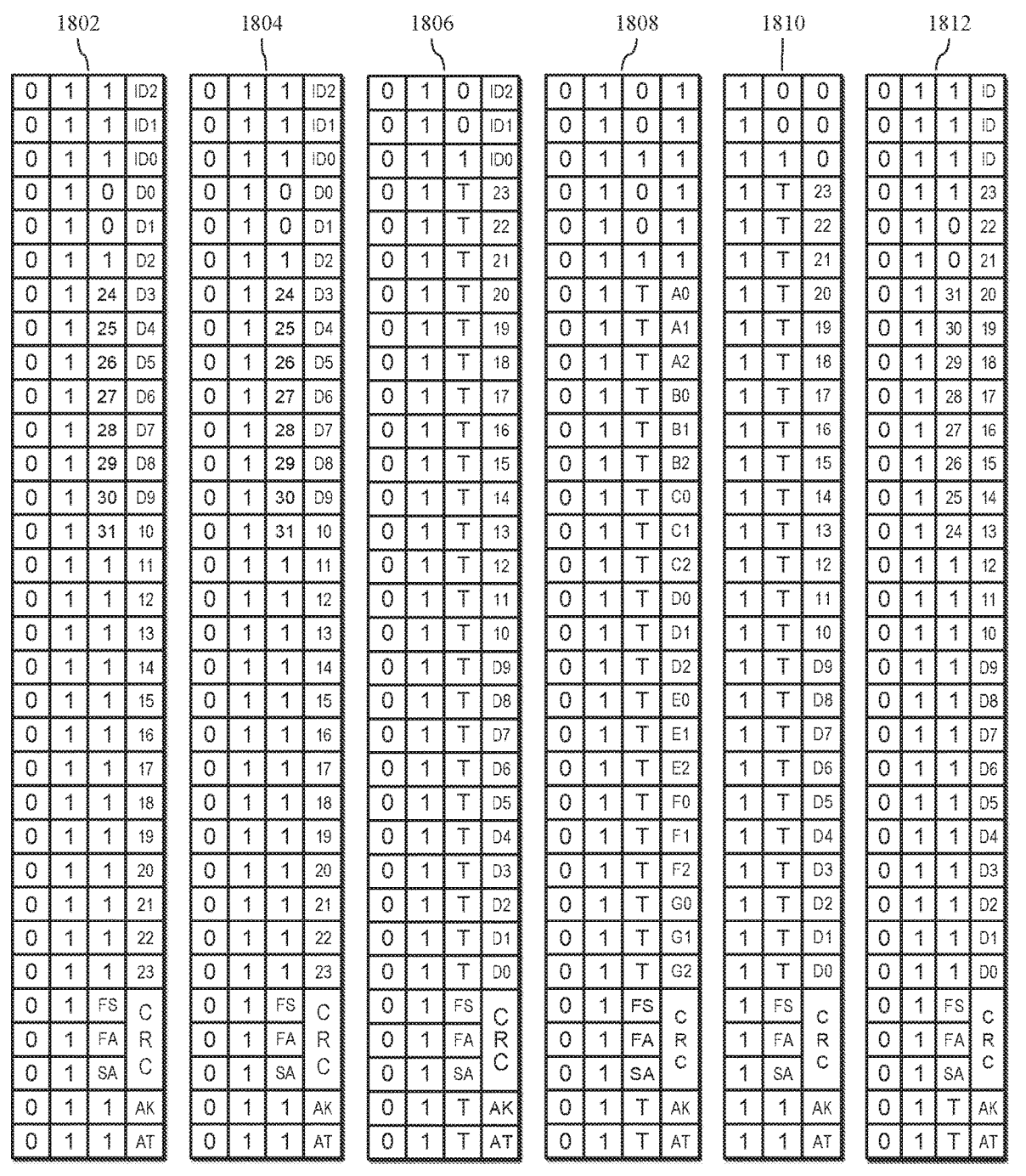
Figure 18B:
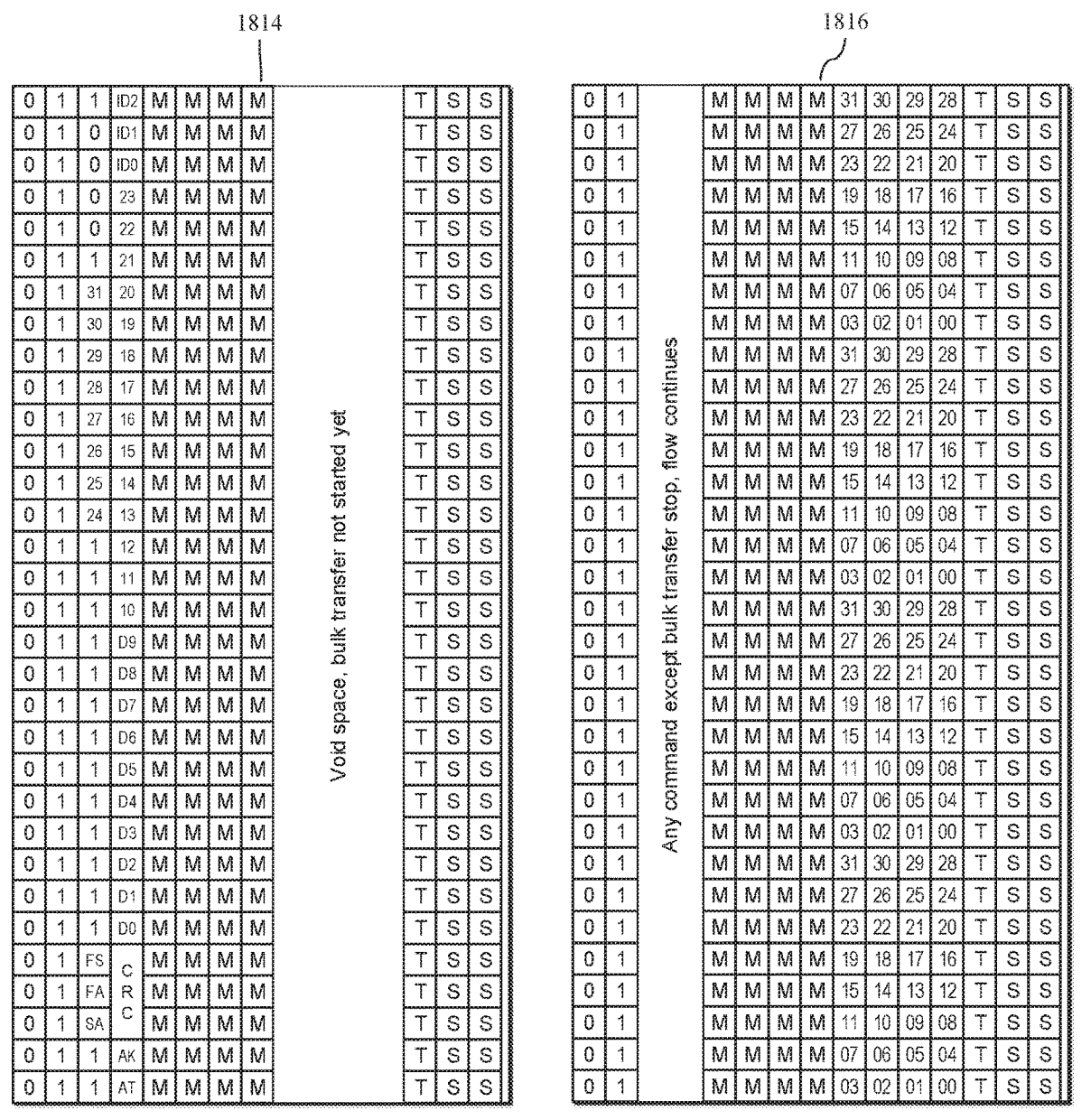
Figure 18C:
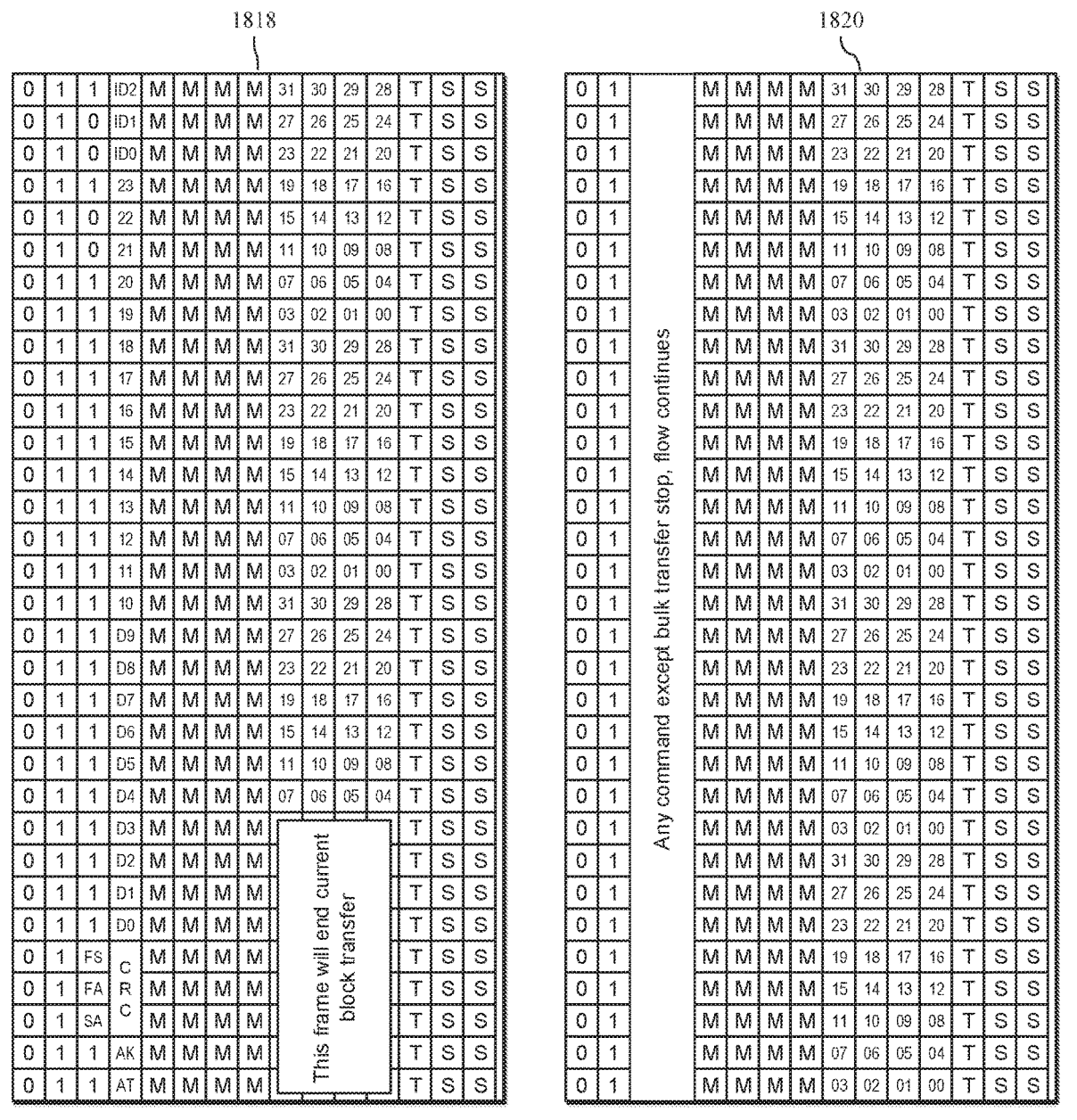

Referring to FIGS. 18A, 18B and 18C, block transfer operations will now be described in further detail. A 32-bit address is assigned to a slave device (no increment on subsequent operations) as illustrated in frame 1802. Due to the tight timing, the device ID and the initial values in column two may be buffered since the command is first completed after these values have been sent. Next, as illustrated in frame 1804, a 32-bit address is assigned to a slave device (increment on subsequent operations). As illustrated in frame 1806, read 24 bits using previous assigned address (exception in command, if ID=address 7) is obtained. As illustrated in frame 1808, the read status of all attached devices (exception in reach command, ID=7). The first three bits of the 24-bit returned data is not used and may be overwritten by the last used bulk transfer port. Frame 1810 illustrates read status from last bulk transfer operation (exception in read command, ID=0)—e.g., read 24 bits CRC value from last used bulk transfer port. Frame 1812 illustrates write 32 bits using previous assigned address. The slave device will not know this is a write command until line 6, which means it will need to buffer the register data in lines 4, 5 and 6 to prepare for a possible write command.

Frame 1814 in FIG. 18B illustrates initiation of 32-bit block write transfer operations. The writing of data will first start in two frames later (i.e. not in this nor in the following frame). Until the third frame starts, the frame layout will be the same. Frame 1816 illustrates a transfer of write bulk data (continuous). Frame 1818 illustrates an initiation of a 32-bit block bulk read transfer operations. The reading of register data will first start in third frame. Until the third frame starts, the frame layout will be the same as in previous frame (i.e. bulk transfer has not started yet). D0-D23 are mapped to devices 0-7. Each device can have at most three bulk transfer ports. A value of 0 indicates the port will be activated in two frames. Each device is assigned three bits (e.g., Device 1 is assigned bits D3-D5, each corresponding to an internal bulk transfer port). Frame 1820 illustrates transfer of read bulk data (continuous).

Frame Synchronization Algorithm

The Master assumes that a slave device will have obtained sync (PLL/DLL lock) after a certain period of time. Slave devices may attach to the bus at any supported speed and provide feedback on their capability. An embodiment for checking whether a slave device has obtained message synchronization before starting communication is provided. In some embodiments, a single frame message is used. Beacons may be available to indicate the start of a frame and can be used for synchronization.

Figure 19:
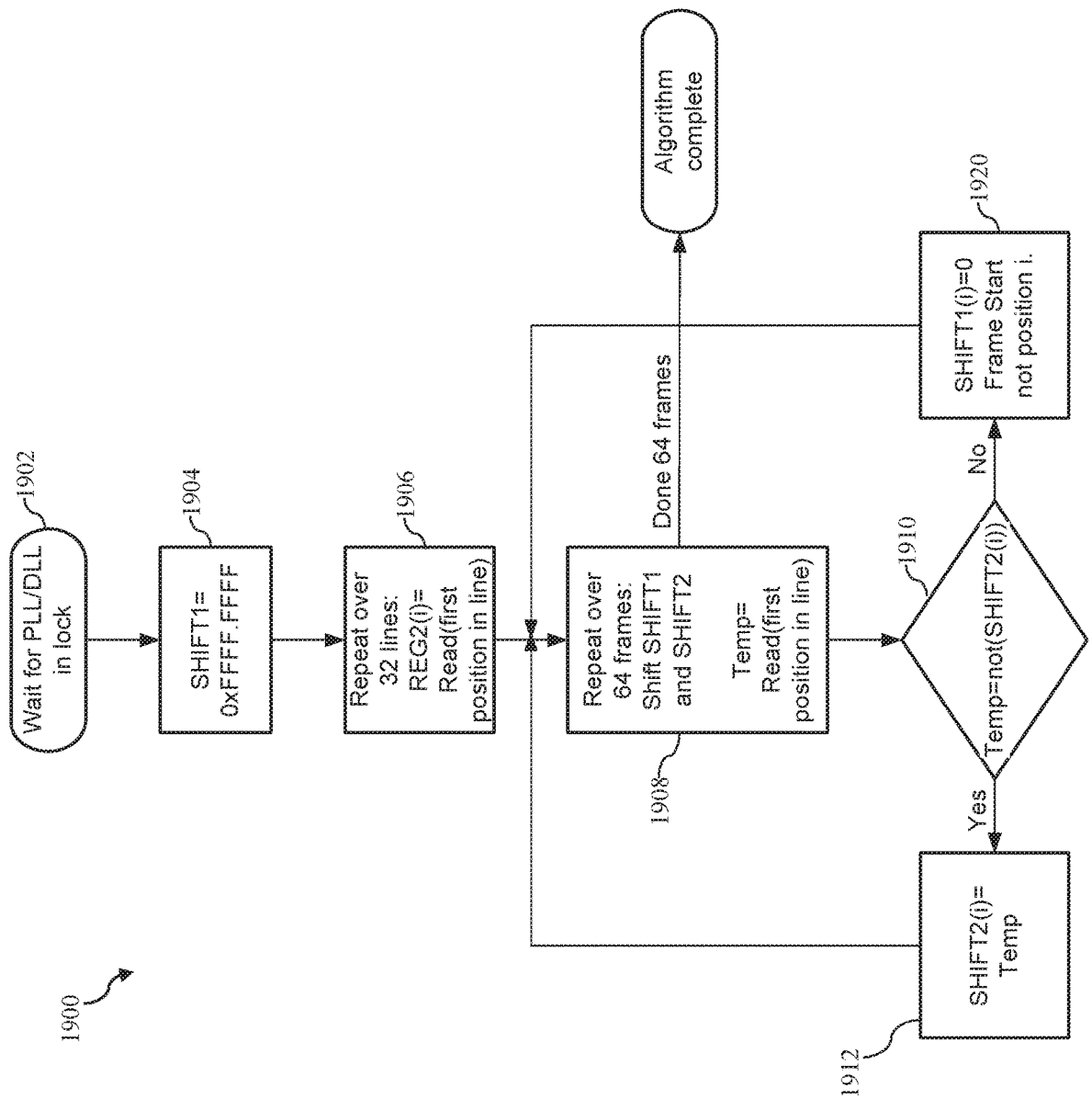
FIG. 19 illustrates an example frame synchronization algorithm in accordance with one or more embodiments.

Referring to FIG. 19, an embodiment of a frame synchronization algorithm 1900 will now be described. In step 1902, the process waits for the PLL or DLL to be in lock with the master. In step 1904, a shift register (SHIFT 1) is set to 0xFFFF.FFFF. In step 1906, the first value from is read from the first line into the second shift register. This procedure is repeated over 32 lines to initialize the search register. In some embodiments, each line is repeated at 3.072 MHz, which may provide a sampling point for PDM and high-quality audio. Each frame is repeated over 32 lines, giving a frame repetition frequency of 96 kHz. In some embodiments, a beacon indicated the end of a frame and is sent every second frame (at a 48 kHz repetition rate).

The next steps are then repeated over 64 frames. In step 1908, the value is read from shift register 2, which should be the opposite value of the new read value (comparison made in step 1910). If not, then this bit in the first shift register is reset in step 1920, otherwise the process proceeds to step 1912 to update the second shift register, SHIFT 2. Step 1908 shifts both registers and continues to complete the 32 lines. The process is then repeated over 64 frames. By checking the alternating pattern, frame sync can be achieved after 64 frames. In other words, instead of checking for the actual synchronization position, this algorithm clears all invalid positions, until only a single valid position is left. This method guarantees that the slave device will always get in lock, regardless of any random data occurring in the command column. If the 32-bit register contains more than a single bit that is still set after 64 frames, the method is repeated until the invalid positions have been cleared.

In the illustrated embodiment, the only bit in the first shift register that is one signifies the frame sync position. In some embodiments, if there is more than one bit in the first shift register with a value of one, then an error has occurred, and the algorithm should be restarted. This is not expected to happen under normal circumstances (for random data the probability of this happening is $2^{-64} < 10^{-20}$).

In one implementation, all the fields are oversampled using the Master clock. A line of data is divided into 80 timeslots and multiple timeslots are used to define data on the bus. All the fields may be oversampled using the Master clock. The default clock frequency is set to 245.76 MHz in this embodiment, but other frequencies may be used. The initial PLL synchronization frequency is set to 3.072 MHz for a Slave device and a Master Device, but other frequencies may be used as described herein.

The interpretation of these timeslots will depend on the configuration chosen, though the individual fields will be in the same sequence. At boot up, the default data format is set for the longest bus diameter (slowest speed). Referring to FIG. 16c, an example frame structure is illustrated showing the different fields in each line of data. By changing the interpretation of the individual timeslots, it is possible to select various compromises between baud rate and bus diameter. The synchronization pattern repeats with a frequency of one per line of data. The synchronization pattern is a zero to one transition.

In the illustrated embodiment, a line includes of a synchronization field (0-1), a turn-around period $T_1$ (a period where neither the Master Device nor any Slave Device are active to allow for a change in direction this time slot also including forward command (master control) and framing information, F), a command field (CMD or reply R), a field for transport of audio in the forward direction (typically from Master to Slave), a field for transport of bulk register data from master to slave $B_1$, a turn-around period $T_2$ to enable changing of signaling direction, a field for transport of audio in the backward direction (typically from Slave to Master), a field for transport of bulk data from Slave to Master $B_2$ and a void field for alignment of data before the next line starts.

When the Master issues a command in the command field, it will also drive the adjacent $T_1$ field with the same value to ensure better timing margins. However, when the Master is expecting a reply from a Slave Device, it will not drive the $T_1$ and CMD fields. The $T_2$ field is not driven by any device and allocated for data turn-around. When a Slave device issues a response within the command field, it will only drive the 'CMD' field and the adjacent $T_1$ field will be undriven and used for turn-around of the signals. The actual distance from a Slave Device to the Master Device may be unknown. Therefore, commands will be issued, that will measure the actual delay from a Slave Device to the Master Device. The actual delays will be used to optimize the timing, e.g., optimize the receive eye diagram.

The number of time slots allocated to each of these fields may vary with the application, but in the illustrated embodiment the total number of time slots within a line is 80. The default configuration at start-up indicates the number of the timeslot at the start of each field. No timeslots are allocated for bulk transfers at startup.

The timeslots marked $T_N$ is for a turn-around delay. The actual data value inside these timeslots are undefined. The turn-around delays $T_1$-$T_2$ are allocated to allow the data direction to change (i.e., from forward wave to backward wave and vice-versa). The number of bits transmitted from a Master and a Slave device may vary and should be programmed before any transmission starts. In the example shown above, the Master transmits 6 bits to the Slave in each line and the Slave transmits 4 bits to the Master in each line. The example shows the default configuration and the bandwidth allocated to Master and Slave may be programmed to other configurations. The synchronization pattern stays fixed regardless of the data configuration. By programming the number of timeslots assigned per data bit and for commands turn-around etc. it is possible to increase the bandwidth considerably, typically at the cost of higher jitter requirements and shorter maximum bus diameter. This programmability allows a system designer to trade off bandwidth for higher signal integrity by deciding how much bandwidth is available for sync, commands and data in each direction. Also, by programming the slew-rate and output transmission voltage, the signal integrity can be optimized while enabling a system to pass EMI requirements.

When the Master issues a command in the command field, it will also drive the adjacent $T_1$ and $T_2$ fields with the same value to ensure better timing margins. However, when the Master is expecting a reply from a Slave Device, it will not drive the $T_1$, CMD and $T_2$ fields. When a Slave device issues a response within the command field, it will only drive the 'CMD' field and the adjacent $T_1$ and $T_2$ fields will be undriven and used for turn-around of the signals. The actual distance from a Slave Device to the Master Device may be unknown. Therefore, commands will be issued, that will measure the actual delay from a Slave Device to the Master Device. The actual delays will be used to optimize the timing, e.g., optimize the receive eye diagram. The Master will sample the Slave delay ½ data unit before the normal sampling, i.e. at the edge between two data values for delay optimization, while the value used for high data integrity will be located in the middle of each data-unit.

Two times oversampling may be achieved by using both edges of the clock. When the Master issues a command in the command field, it will drive the adjacent 'T' fields with the same value. When a Slave device issues a response within the command field, it will only drive the 'R' field and the adjacent 'T' fields will be undriven and used for turn-around of the signals. If the bus diameter is short and the bus frequency is low, leakage currents may change the bus value before a delay measurement can be made. In this case, it is best to include a bus holder in the system to ensure leakage currents will not affect any delay measurement. The output impedance of such a bus holder will typically be in the range 1-2 kΩ.

A Slave device should respond by telling the device status, once it is in lock. The Slave PLL circuit should be able to obtain lock with the Master within 1 ms and be able to output a "PLL in lock" signal, that will be used by other control circuitry. Furthermore, the PLL should expect a logic signal from the Slave Command Controller ("Message Sync" signal). When the "Message Sync" signal is high and the Slave PLL has determined it is in lock, it should change to narrow bandwidth mode. In narrow bandwidth mode, the time gate will only allow the output from the phase detector in a narrow time window around the synchronization edge. If either of these signals are not active (high), the PLL should change to wide band phase detection and the slave device should not be able to write to the bus (this is done, so it cannot overwrite other devices).

Audio data can travel in both directions on the link, i e in the forward direction from the Master Device to Slaves Devices and in the backward direction from Slaves Devices to the Master Device. If a Slave Device wants to transfer data to another Slave Device, that is located further away from the Master than the Slave Device itself, it will send data in the forward direction, i.e. in the field labelled "Master Audio".

Port Programming

In various embodiments, data transfers are handled through port programming. To enable data to be transferred from any transmitting port to any receiving port, data may be handled like mono channels. Using this approach, stereo channels and multi-channel systems will use longer programming sequences as compared to a situation where the channels could be treated as a group. However, this approach is simpler and give more flexibility with the respect to arbitrary transfer of data.

All registers associated with a port will have a bank (shadow) register. The selection of the primary and the shadow register is accomplished through writing to the bank select register. To avoid catastrophic changes to the behavior of the bus due to a change in bank register value by one or more errors, this register has been extra protected. In other words, to change the bank value, it is required to write a specific 8-bit value to a specific register to select bank number one and a different 8-bit value with a long hamming distance between these two words to select bank number zero. The bank registers are used to change seamlessly between two or more playback modes without encountering any glitches or distortion when changing from one scenario to another. Notice, to avoid any audio glitches, it may also be necessary to pay attention to group delays when changing filter configurations by suitable buffering.

To be able to freely transfer any data from any transmitting port to any receiving port, both the transmitting and receiving port can freely program the position of data within a frame. For example, a row variable may allow the selection of the first row of data to be written in, and a row increment can be used to select the spacing to the next active row. A column variable may be used to select the first column to be written in and a "last column" variable may be used to select the last column in which data are being written in or read from. The length of data from a given data port may also be programmed (e.g., data word length). In some embodiments, the data values may extend over more than one frame and synchronization of streams may be programmed. This is typically being accomplished by using the beacon bits for achieving this synchronization.

Bulk transfers may require the row start, row increment, column start and column stop registers to be defined before bulk transfers are to be enabled. A bulk control bit may be used to enable and disable bulk transfer commands. Only ports that support bulk transfer will use this bit, otherwise the value is ignored. Bulk transfers may have an additional register containing a 24 bit CRC check value of all bit transferred during the last bulk operation performed by the port. Each device can only have a single bulk transfer port operating at the same time and will normally never have more than one bulk transfer port. The bulk control registers may include a start register (e.g., 32-bit address), an end register (e.g., 32-bit address) or a length register (e.g., 32 bits), a flag indicating single or continuous transfer, and a read/write direction flag. Notice, the port has to be enabled first for it to react to the start bulk transfer command. The ports that are enabled during port transfers are given by a 24-bit word written by the Master. During the start of bulk transfer operations, a 24-bit word is written by the Master. Each device assigns these bits internally to bulk transfer ports (if any are implemented).

Power Consumption

For short systems with moderate bandwidth requirements, it is possible to reduce the power consumption considerably by avoiding termination of the link. Instead, the transmitter will be series terminated with the line impedance. To avoid any reflections from the transmitter side, the transmitter output impedance should be relatively stable also during changing out the output level. This can be accomplished by having multiple drivers, that are successively activated one at a time, so that there will not be a time zone, where the output impedance will suddenly be very high. Also, if there are only two devices located at each end of a transmission line, the problems with reflection will disappear and high speed and low power can be achieved with unterminated ends of the links and series terminated transmitters.

By avoiding the parallel termination, the power consumption will decrease to 2×125 µW=250 µW by the capacitively charging alone (based on 250 mV signaling, 50 pF load and 40 Mbit signaling). In practice, we will need to add the power consumption of the receiving PLL (say, 250 µW) and some extra bandwidth for control overhead, but a power budget below 1 mW is not unrealistic.

In various embodiments, the Master should be able to wake up the Slave and the Slave should be able to wake up Master. The simplest zero power wakeup (<1 µA) mode would utilize a higher signaling voltage (≈1V) to ensure good signal integrity and a power down of all other circuits. A more complicated solution could maintain the same signaling voltages in all modes but this would require more complicated circuits and the receiver circuits to be turned on all the time (100 µA). The Master will write to all Slaves and tell the bus stop will start in next frame. For multi-drop busses, this would require the end-point node to disable its termination at the end of the frame. In the next frame, the Master would drive D+ to VDD using a weak driver (≈5 kΩ)). The high impedance may be used to lower any EMI during transition. As long as D+ is VDD it is an indication that the low power state is still active. An Slave could pull down the D+ line to signal a wakeup event, using a medium strength driver (≈600Ω). This would ensure a transition of at least 7 ns (15 pF load or more). This line would have to be pulled low for at least 50 µs to ensure the Master has registered the event (even if a standard 32.768 kHz low power wake up clock is used in Master). After at most 100 µs the Slave will disable pull down event and the Master would begin to drive bus for at least 100 µs after event has been registered after which the bus will restart.

PLL Synchronization

When the system powers up, a Slave Device will need to establish synchronization with the Master Device. This is accomplished in the following manner: (i) the Master will send out a fixed synchronization pattern (zero to one transition) in every line; (ii) the Master will define all bits in a frame except time slots allocated to command replies and turn-around; (iii) when the Slave device PLL/DLL is in lock with the Master, it replies with activating the "Slave in lock" bit (see EarLink, Command Section); and (iv) now the Master device can program the Slave Device.

In one embodiment, a line includes 80 timeslots regardless of clock frequency and power mode. The synchronization pattern repeats with a frequency of one per line. The synchronization pattern is a zero to one transition. Only the first zero-to-one transition in a line/cycle is used by the Slave Device PLL/DLL. Because the command time slot follows immediately after the synchronization time slot, it means there initially is only a single zero-to-one transition within a line, and therefore the synchronization event for the PLL will be uniquely defined. As long as the rising clock edge is used for synchronization, the Slave PLL/DLL circuit should be able to obtain lock with the Master within 1 ms and be able to output an internal "PLL/DLL in lock" signal, that will be used by other control circuitry. Furthermore, the PLL/DLL should expect a logic signal from the Slave Command Controller ("Message Sync" signal). When the "Message Sync" signal is high and the Slave PLL/DLL has determined it is in lock, it should change to narrow bandwidth mode. In narrow bandwidth mode, the time gate will only allow the output from the phase detector in a narrow time window around the synchronization edge. If either of these signals are not active (high), the PLL/DLL should change to wide band phase detection (i.e. disable the phase/delay detector window gating logic and disable the slave output transmitter to avoid a bus collision). The master should read the device status and thereby detect when the slave has obtained lock. Furthermore, this message may be used to optimize the delay timing for slave devices and should be completed before port transfers are started.

After synchronization has been acquired, a window (e.g., +/− three timeslots, half of the sync time slot consisting of six timeslots) around the transition will be open for the PLL/DLL. The reason for the use of a narrow time window for the PLL is that the output from the phase detector that is to be integrated by the PLL shall not be confused by any data communication on the bus. Thus, it is necessary to start the PLL with a wide receiver bandwidth, i.e. wide in the time domain and later time-gate the input to the PLL integration unit. The width of the time-gate window depends of the width of a time-slot, with one timeslot determined by one clock period of the Slave PLL. With an internal clock frequency of about 294.912 MHz (3.072 MHz×96), this translates to about +/−10.2 ns for systems using 6 time-slots to transmit one synchronization bit. This configuration will accept jitter up to about 727 $ps_{RMS}$ for a peak jitter that is about 14 times this value (for a bit error rate of $10^{-12}$).

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a master device coupled to a multi-drop bus for digital communications using a communications protocol comprising a plurality time slots; and
   a first slave device coupled to the multi-drop bus and configured to transmit and receive digital communications with the master device in accordance with the communications protocol;
   wherein at least one of the time slots is used to define a communications configuration for the first slave device to dynamically optimize bandwidth and/or signal integrity;
   wherein intermediate nodes on the multi-drop bus are connected to the multi-drop bus with short interruption to a travelling wave; and
   wherein a physical length of disruptions to the transmission line resulting from intermediate nodes are shorter than the shortest wavelength used for signaling.

2. A system comprising:
   a master device coupled to a multi-drop bus for digital communications comprising audio data and control signals using a communications protocol comprising a plurality time slots; and
   a first slave device coupled to the multi-drop bus and configured to transmit and receive digital communications with the master device over the multi-drop bus in accordance with the communications protocol;
   wherein at least one of the time slots is used to define a communications configuration for the first slave device to dynamically optimize bandwidth and/or signal integrity, and
   wherein delays between devices are measured by charging the bus to a known value, disabling drivers at a beginning and an end of the bus to cause the bus to be floating and not terminated during measurement, waiting for the devices to change a level on the bus, and measuring a transition delay.

3. A system comprising:
   a master device coupled to a multi-drop bus for digital communications comprising audio data and control signals using a communications protocol comprising a plurality time slots; and
   a first slave device coupled to the multi-drop bus and configured to transmit and receive digital communications with the master device over the multi-drop bus in accordance with the communications protocol;
   wherein at least one of the time slots is used to define a communications configuration for the first slave device to dynamically optimize bandwidth and/or signal integrity, and
   wherein the system timing is obtained from a fractional phase locked loop (PLL) disposed in the master device and/or the first slave device and the PLL is dithered by adding an output from a pseudorandom generator to a fractional adder thereby reducing electromagnetic interference.

4. The system of claim 3, wherein the PLL is configured to obtain lock between the master device and the first slave device.

5. The system of claim 4, wherein the PLL includes a time-gate that is enabled during initial locking of the PLL and later only allows synchronization information to pass through to avoid the PLL to lock onto random bus traffic.

6. A system comprising:
   a master device coupled to a multi-drop bus for digital communications comprising audio data and control signals using a communications protocol comprising a plurality time slots; and
   a first slave device coupled to the multi-drop bus and configured to transmit and receive digital communications with the master device over the multi-drop bus in accordance with the communications protocol;
   wherein at least one of the time slots is used to define a communications configuration for the first slave device to dynamically optimize bandwidth and/or signal integrity, and
   wherein a pseudorandom generator is configured to scramble an output of one or more data ports thereby enabling a lower electromagnetic interference by whitening an output spectrum.

* * * * *